United States Patent
Perahia et al.

(10) Patent No.: US 11,133,846 B2
(45) Date of Patent: Sep. 28, 2021

(54) ENHANCED CLIENT GROUPING BY A NETWORK DEVICE

(71) Applicant: Hewlett Packard Enterprise Development LP, Houston, TX (US)

(72) Inventors: Eldad Perahia, Park City, UT (US); Liang Li, Santa Clara, CA (US); Mohd Shahnawaz Siraj, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 214 days.

(21) Appl. No.: 16/296,809

(22) Filed: Mar. 8, 2019

(65) Prior Publication Data

US 2020/0259533 A1    Aug. 13, 2020

Related U.S. Application Data

(60) Provisional application No. 62/804,096, filed on Feb. 11, 2019.

(51) Int. Cl.
| | |
|---|---|
| *H04B 7/0452* | (2017.01) |
| *H04B 7/06* | (2006.01) |
| *H04B 7/0417* | (2017.01) |
| *H04B 15/00* | (2006.01) |

(52) U.S. Cl.
CPC .......... *H04B 7/0452* (2013.01); *H04B 7/0417* (2013.01); *H04B 7/0626* (2013.01); *H04B 15/005* (2013.01)

(58) Field of Classification Search
CPC .......... H04B 7/0452; H04B 7/02; H04B 7/06; H04B 15/005
See application file for complete search history.

(56) References Cited

U.S. PATENT DOCUMENTS 8,625,632 B2    1/2014  Roman et al.
8,761,291 B2    6/2014  Jin et al.
(Continued)

OTHER PUBLICATIONS

Cisco Bug: CSCvc93398—Clsco 2800, 3800 AP MU-MIMO forms MU groups with 2SS clients, (Web Page), May 31, 2018, 2 Pgs.
(Continued)

*Primary Examiner* — Diane L Lo
*Assistant Examiner* — Abusayeed M Haque
(74) *Attorney, Agent, or Firm* — Hewlett Packard Enterprise Patent Department

(57) ABSTRACT

Examples described herein provide enhanced client grouping by a network device. Examples include determining that a plurality of client devices each comprising a plurality of receiver antennas are associated with a network device, and grouping the client devices into one or more groups, wherein each group comprises a number of client devices less than or equal to the number of transmitter antennas of the network device. Examples include, for each group, assigning one spatial stream to one receiver antenna for each client device of the group, and based on a determination that the number of client devices of the group is greater than one and less than the number of transmitter antennas, assigning one spatial stream to each of a portion of the remaining receiver antennas of the group, wherein at least one receiver antenna of the group is not assigned a spatial stream.

20 Claims, 14 Drawing Sheets

(56) References Cited

U.S. PATENT DOCUMENTS

| | | | | |
|---|---|---|---|---|
| 2006/0002486 A1* | 1/2006 | van Nee | ................ | H04L 1/0656 |
| | | | | 375/260 |
| 2010/0061402 A1* | 3/2010 | van Zelst | ............ | H04L 25/0226 |
| | | | | 370/474 |
| 2011/0205913 A1* | 8/2011 | Van Zelst | ............ | H04B 7/0617 |
| | | | | 370/252 |
| 2013/0010708 A1* | 1/2013 | Abraham | ............ | H04W 72/046 |
| | | | | 370/329 |
| 2013/0010780 A1* | 1/2013 | Fertonani | ............. | H04B 1/7073 |
| | | | | 370/342 |
| 2014/0079145 A1* | 3/2014 | Sampath | .............. | H04B 7/0811 |
| | | | | 375/260 |
| 2014/0146902 A1* | 5/2014 | Liu | ........................ | H01Q 21/28 |
| | | | | 375/260 |
| 2015/0188662 A1* | 7/2015 | Shapira | ................ | H04W 12/03 |
| | | | | 455/1 |
| 2017/0332389 A1 | 11/2017 | Sun et al. | | |
| 2019/0036642 A1* | 1/2019 | Huang | ................... | H04B 7/068 |

OTHER PUBLICATIONS

Kosek-Szott, K., Improving DL-MU-MIMO Performance in IEEE 802.11ac Networks Through Decoupled Scheduling, (Research Paper), Apr. 27, 2017, 21 Pgs.

Teckchandani, A. et al., MU-MIMO Tech Brief, (Web Page), Retrieved Jan. 13, 2019, 32 Pgs.

* cited by examiner

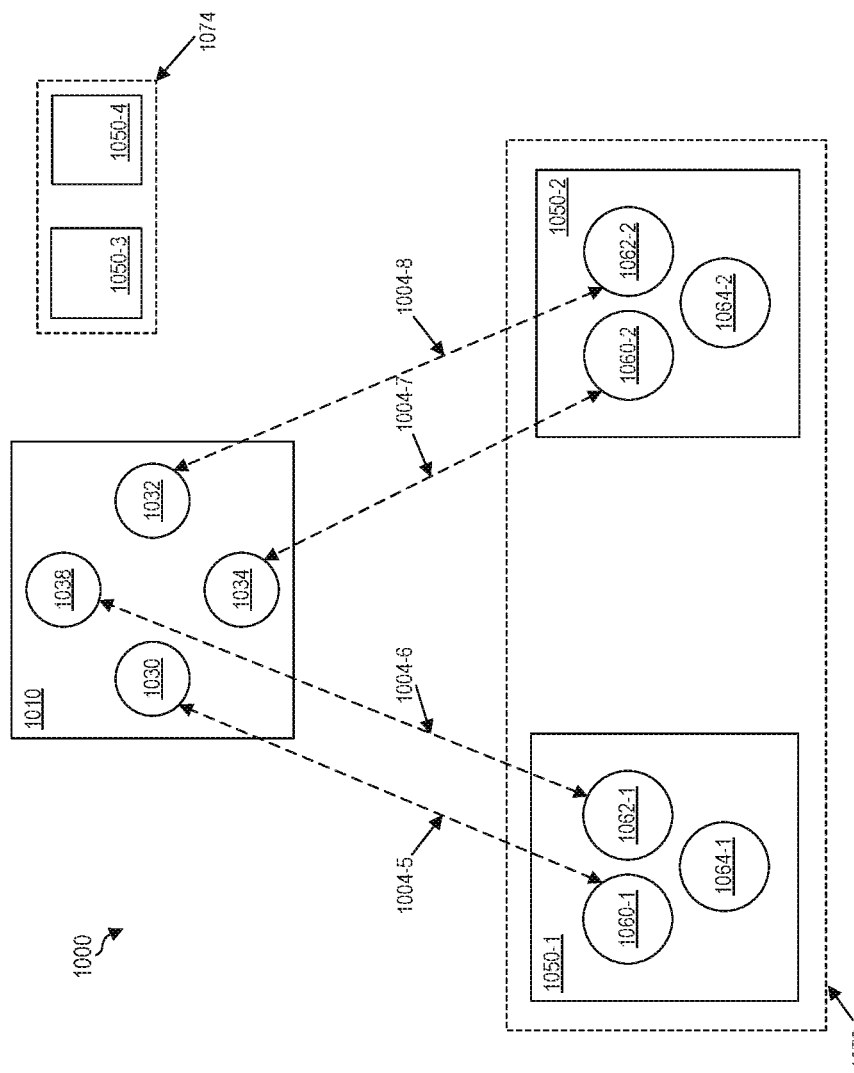

ENHANCED CLIENT GROUPING BY A NETWORK DEVICE

BACKGROUND

A network device may provide a communication link between nodes of a computer network. Moreover, a network device may provide a communication link between two or more computer networks. For example, a network device may provide a wireless communication link between two or more client devices in a wireless local area network (WLAN). Moreover, in such example, the network device may provide a communication link between the Internet and the WLAN.

Throughput is an indicator of performance for a network device. Throughput is a rate of successful data transmission across a communication link between nodes of a computer network. Throughput may depend on a bandwidth of the communication link, a maximum rate of data transmission (i.e., peak data rate or peak bit rate) across the communication link, or a combination thereof. Moreover, throughput may depend on an amount of data packet loss during data transmission across the communication link. For example, a network device may increase throughput, and thereby improve performance, by increasing bandwidth of a communication link, reducing data packet loss during data transmission across the communication link, or a combination thereof.

BRIEF DESCRIPTION OF THE DRAWINGS

Various features and advantages of the invention will become apparent from the following description of examples of the invention, given by way of example only, which is made with reference to the accompanying drawings, of which:

FIGS. 10A and 10B show examples of enhanced client grouping by an example network device.

DETAILED DESCRIPTION

Figure 1:
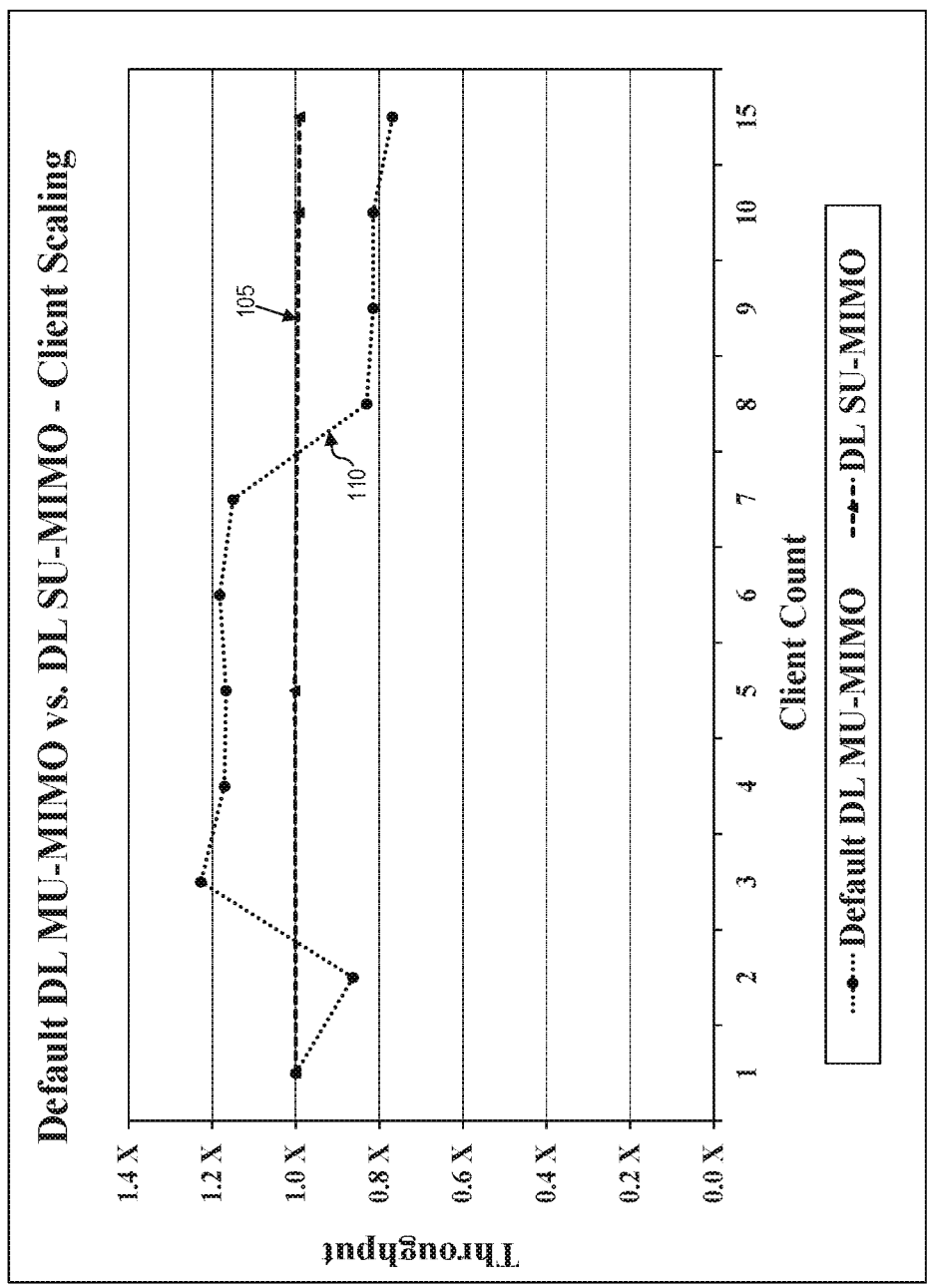
FIG. 1 is a graph which shows client scaling of an example network device.

A network device may transmit data from one or more computer networks to a downlink client device using a downlink single-user, multiple-input, multiple-output (DL SU-MIMO) scheme. DL SU-MIMO is a wireless communication functionality which allows a network device to simultaneously transmit multiple streams of data (i.e., spatial streams) to multiple receiver antennas of a single downlink client device. When a network device uses DL SU-MIMO to transmit multiple spatial streams to multiple receiver antennas of a client device, the network device may have increased throughput as compared to when the network device transmits only a single spatial stream to a single receiver antenna of the client device.

Recently, there have been efforts to develop network devices which can transmit data from one or more computer networks to multiple downlink client devices using a downlink multi-user, multiple-input, multiple-output (DL MU-MIMO) scheme. DL MU-MIMO is a wireless communication functionality which allows a network device to simultaneously transmit multiple spatial streams to multiple receiver antennas of multiple downlink client devices. DL MU-MIMO may provide at least the following advantages over DL SU-MIMO. First, whereas a network device using DL SU-MIMO can only transmit data to one client device at a time, a network device using DL MU-MIMO can transmit data to multiple client devices simultaneously. Second, whereas throughput of a network device using DL SU-MIMO is limited to throughput capacity of a single client device, throughput of a network device using DL MU-MIMO may be based on a combined throughput capacity of multiple client devices. Thus, when transmitting multiple spatial streams to multiple client devices, a network device may have increased throughput when using DL MU-MIMO as compared to when using DL SU-MIMO.

Despite the great potential that DL MU-MIMO offers, it was discovered that for some numbers of client devices (i.e., client counts), a network device using DL MU-MIMO according to prior approaches may have decreased throughput as compared to when using DL SU-MIMO. As explained herein, it was discovered that according to prior approaches, a network device using DL MU-MIMO for some client counts may not mitigate interference when transmitting multiple spatial streams assigned to a group of the client devices, when the group of the client devices has multiple client devices and does not have at least one receiver antenna that is not assigned a spatial stream. Moreover, as explained herein, it was discovered that this failure to mitigate interference may decrease throughput when using DL MU-MIMO as compared to when using DL SU-MIMO.

To address these issues, examples described herein provide enhanced client grouping by a network device. For example, a network device, comprising a plurality of transmitter antennas, may determine that a plurality of client devices each comprising a plurality of receiver antennas are associated with the network device, and group the client devices into one or more groups, wherein each group comprises a number of client devices less than or equal to the number of transmitter antennas. In such example, the network device may assign, for each group, one spatial stream to one receiver antenna for each client device of the group, and for each group, based on a determination that the number of client devices of the group is greater than one and less than the number of transmitter antennas, assign one spatial stream to each receiver antenna of a portion of the remaining receiver antennas of the group, wherein at least one receiver antenna of the group is not assigned a spatial stream.

In this manner, examples described herein may increase throughput of a network device when using DL MU-MIMO as compared to prior approaches. For example, the network device may provide, for each group of multiple client devices, at least one receiver antenna that is not assigned a spatial stream which can be used for cancelling interference when transmitting the spatial streams assigned to the client devices of the group. Accordingly, in such example, a network device that uses DL MU-MIMO according to the present invention may avoid decreased throughput for some client counts, as compared to when using DL SU-MIMO for the same client counts. In examples described herein, DL MU-MIMO techniques according to the present invention are hereinafter referred to as "Enhanced DL MU-MIMO."

Referring now to the drawings, FIG. 1 is a graph 100 showing default client scaling for an example network device using DL MU-MIMO according to prior approaches. In examples described herein, DL MU-MIMO techniques according to prior approaches are hereinafter referred to as "Default DL MU-MIMO." As shown in FIG. 1, client scaling is measured as throughput of the network device versus client count of client devices associated with the network device. In the example of FIG. 1, throughput values of the network device are shown as relative values based on a scale factor X. In such example, scale factor X represents throughput achieved by the network device when using DL SU-MIMO to transmit one spatial stream to each of two receiver antennas of one client device. In such example, scale factor X may have units corresponding to a data rate (i.e., bit rate), such as megabits per second (Mbps), or the like. In the example of FIG. 1, client scaling results were obtained by transmitting, by the network device, data packets to different client counts associated with the network device, and then measuring throughput of the network device during transmission of these data packets. The client devices which were used to obtain the client scaling results shown in FIG. 1 each comprised two receiver antennas and each had DL SU-MIMO functionality and DL MU-MIMO functionality. Curve 105 represents client scaling results obtained by the network device when using DL SU-MIMO, and curve 110 represents client scaling results obtained by the network device when using Default DL MU-MIMO.

In examples described herein, the network device used to obtain the results shown in FIGS. 1-3 and 8 comprised four transmitter antennas and supported both DL SU-MIMO functionality and DL MU-MIMO functionality. Moreover, the network device supported group sizes of up to three client devices per group and could transmit up to four simultaneous spatial streams to each group of client devices, by transmitting one spatial stream by each one of the four transmitter antennas. It will be understood by one skilled in the art that similar data or results, as shown in FIGS. 1-3 and 8, could be obtained by other suitable type(s) of network devices, now known or later developed, having the same or different numbers of transmitter antennas and supporting the same or different group sizes of client devices.

In examples described herein, a data packet is a formatted unit of data which may be transmitted across one or more communication links of one or more computer networks. In some examples, a data packet may comprise a header and a payload. In such examples, the header may comprise control information for delivering the payload, such as source and destination information, sequencing information, service information, flagging information, other transmission-related information, or the like, or a combination thereof. In some examples, the payload may comprise data which is carried by the data packet. It will be understood by one skilled in the art that a data packet may comprise any suitable format(s) of units of data, now known or later developed.

As shown in FIG. 1, for a client count of one client device, the network device achieved throughput of about 1.0 X when using both DL SU-MIMO and Default DL MU-MIMO. This result was expected, since for a client count of one client device, the network device transmitted two spatial streams to the one client device when using either DL SU-MIMO or Default DL MU-MIMO. However, for a client count of two client devices, the throughput decreased to about 0.86 X when using Default DL MU-MIMO, whereas the throughput remained about constant at about 1.0 X when using DL SU-MIMO. This result was unexpected, since for a client count of two client devices, it was expected that the network device would have higher throughput when using Default DL MU-MIMO as compared to when using DL SU-MIMO. That is, for a client count of two client devices, since the network device had a throughput capacity corresponding to four spatial streams when using DL MU-MIMO, as compared to a throughput capacity corresponding to two spatial streams when using SU MU-MIMO, it was expected that the network device would have higher throughput when using Default MU-MIMO as compared to when using DL SU-MIMO.

As shown in FIG. 1, for client counts from three to seven client devices, the network device achieved throughput of between about 1.15 X and about 1.23 X when using Default DL MU-MIMO, which was approximately 25% greater than the throughput of about 1.0 X achieved when using DL SU-MIMO for the same client counts. However, for client counts of eight or more client devices, throughput of the network device decreased from about 0.83 X for eight client devices down to about 0.77 X for fifteen client devices when using Default DL MU-MIMO, whereas the throughput remained about constant at about 0.99 X when using DL SU-MIMO for the same client counts. Therefore, it was discovered that for client counts of eight or more client devices, a network device may experience decreased throughput when using Default DL MU-MIMO as compared to when using DL SU-MIMO.

Figure 2:
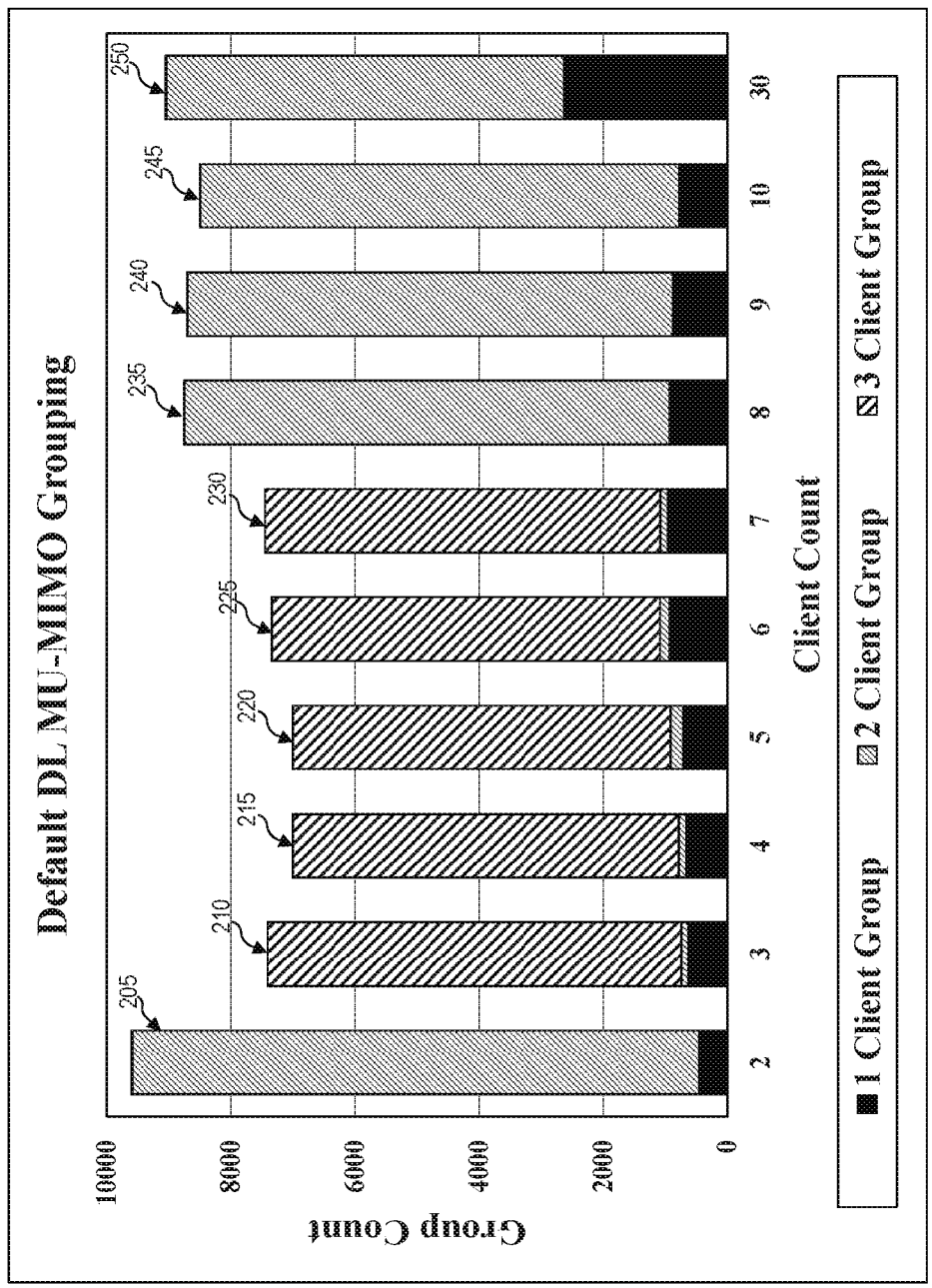
FIG. 2 is a chart which shows client grouping of an example network device.

FIG. 2 is a chart 200 which shows client grouping of an example network device using Default DL MU-MIMO. As shown in FIG. 2, client grouping is measured as a group count associated with the network device versus client count of client devices associated with the network device. In the example of FIG. 2, client grouping results were obtained by transmitting, by the network device, data packets using Default DL MU-MIMO for various client counts, and then capturing and analyzing these data packets to determine the number or clients devices contained in each group of client devices formed by the network device. The client devices that were used to obtain the grouping results shown in FIG. 2 each comprised two receiver antennas and each had DL SU-MIMO functionality and DL MU-MIMO functionality. As shown in FIG. 2, bars 205-250 represent the client grouping results obtained by the network device using Default DL MU-MIMO.

In the example of FIG. 2, for a client count of two client devices, the network device transmitted data packets to both client devices most of the time when using Default DL MU-MIMO, as shown by bar 205. For client counts of three to seven client devices, the network device mostly formed groups of three client devices when using Default DL MU-MIMO, as shown by bars 210-230. For client counts of eight or more client devices, the network device mostly formed groups of two client devices when using Default DL MU-MIMO, as shown by bars 235-250. Moreover, as explained above in relation to FIG. 1, for client counts of two client devices and eight or more client devices, it was discovered that a network device using Default DL MU-MIMO may have decreased throughput as compared to when using DL SU-MIMO. Thus, it was discovered that for client counts of two client devices and eight or more client devices, a network device may experience decreased throughput when using Default DL MU-MIMO, as compared with when using DL SU-MIMO, due to the grouping of client devices and assigning of spatial streams by the network device for such client counts.

Figure 3:
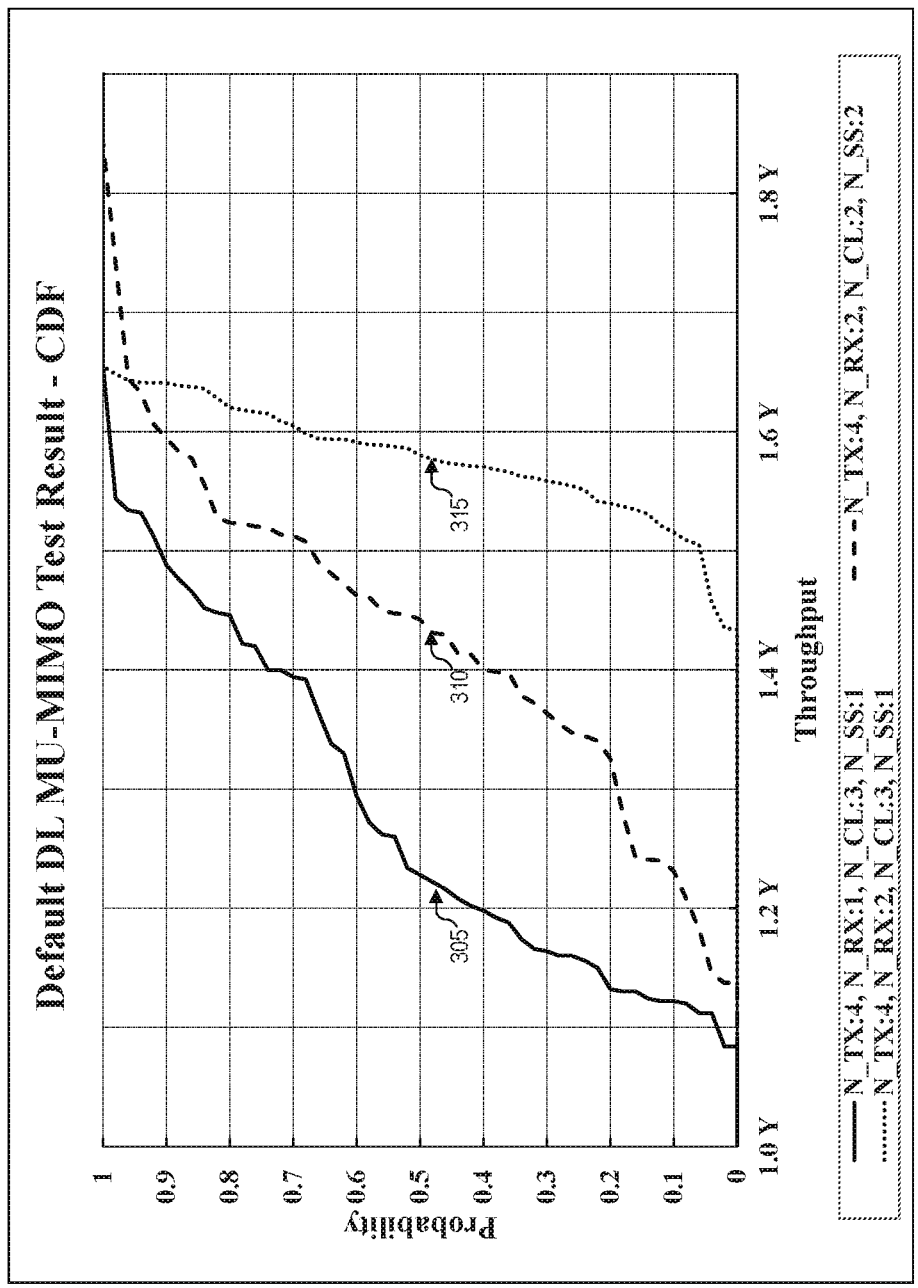
FIG. 3 is a graph which shows a cumulative distribution function of an example network device.

FIG. 3 is a graph which shows a cumulative distribution function (CDF) of an example network device using Default DL MU-MIMO. As shown in FIG. 3, CDF is measured as a probability of throughput versus throughput of the network device. In the example of FIG. 3, throughput values of the network device are shown as relative values based on a scale factor Y. In such example, scale factor Y may have units corresponding to a data rate, such as Mbps, or the like. In the example of FIG. 3, CDF results were obtained by transmitting, by the network device, data packets to different combinations of client devices, and then comparing throughput performance between groups of two client devices having two spatial streams per client device and groups of three client devices having one spatial stream per client device. Curve 305 represents CDF results obtained when the network device transmitted three spatial streams to three client devices each having one receiver antenna. Curve 310 represents CDF results obtained when the network device transmitted four spatial streams to two client devices each having two receiver antennas. Curve 315 represents a CDF results obtained when the network device transmitted three spatial streams to three client devices each having two receiver antennas.

As shown in FIG. 3, when the network device transmitted four spatial streams to two client devices each having two receiver antennas, throughput (as shown by curve 310) was worse about 95% of the time as compared to when the network device transmitted three spatial streams to three client devices each having two receiver antennas (as shown by curve 315.) As explained above in relation to FIG. 1, this result was unexpected, since it had been expected that throughput of the network device would increase, rather than decrease, by transmitting data using a greater number of spatial streams. Furthermore, when the network device transmitted three spatial streams to three client devices each having one receiver antenna, throughput (as shown by curve 305) was worse as compared to when the network device transmitted either four spatial streams to two client devices each having two receiver antennas or three spatial streams to three client devices each having two receiver antennas. Thus, it was discovered that when a network device using DL MU-MIMO transmits multiple spatial streams to multiple client devices having at least one receiver antenna that is not assigned a spatial stream, the network device may experience increased throughput as compared to when the network device transmits multiple spatial streams to multiple client devices which do not have at least one receiver antenna that is not assigned a spatial stream.

Figure 4:
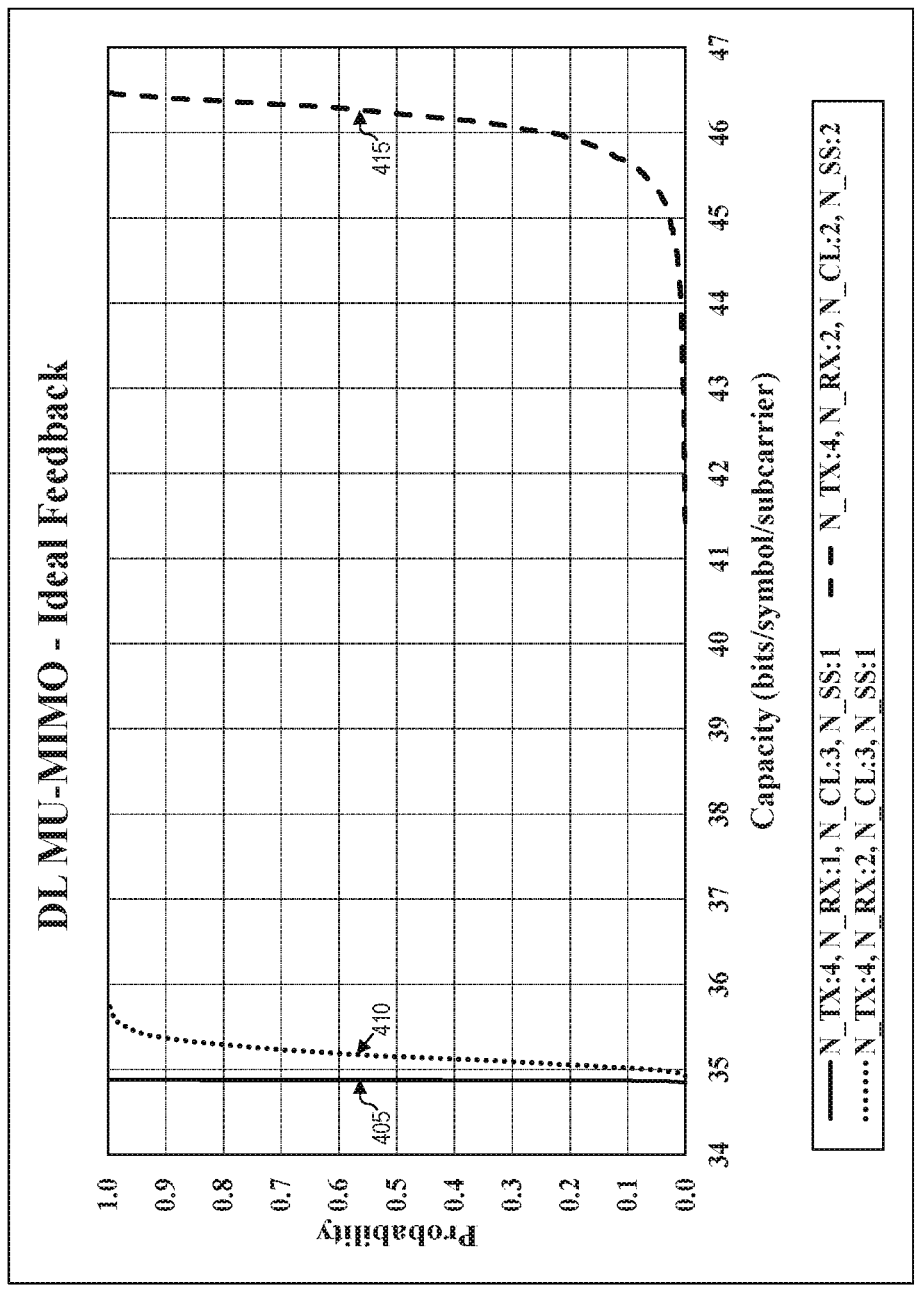
FIG. 4 a graph which shows a probability distribution function of an example simulated DL MU-MIMO system using an ideal channel feedback model.

FIG. 4 is a graph 400 which shows a probability distribution function of an example simulated DL MU-MIMO system using an ideal channel feedback model. As shown in FIG. 4, the probability distribution function is measured as a probability of throughput capacity of the simulated DL MU-MIMO system versus throughput capacity of the simulated DL MU-MIMO system. In the example of FIG. 4, the throughput capacity of the simulated DL MU-MIMO system was modeled by generating independent channel instantiations using the IEEE 802.11ac channel model, and then computing channel state information (CSI) and DL MU-MIMO capacity for each of these independent channel instantiations.

In examples described herein, CSI refers to known channel properties of a wireless signal between a transmitter and a receiver. CSI is used to determine how a wireless signal propagates between the transmitter and the receiver and represents the effect, for example, of scattering, fading, or power decay of the transmitted wireless signal with distance, or a combination thereof.

In the example of FIG. 4, the probability distribution function was obtained by modeling the throughput capacity repeatedly for the simulated DL MU-MIMO system and then aggregating the results. Curve 405 represents a probability distribution function of throughput capacity obtained by the simulated DL MU-MIMO system when it modeled transmission of three spatial streams to three client devices each comprising one receiver antenna. Curve 410 represents a probability distribution function of throughput capacity obtained by the simulated DL MU-MIMO system when it modeled transmission of three spatial streams to three client devices each comprising two receiver antennas. Curve 415 represents a probability distribution function of throughput capacity obtained by the simulated DL MU-MIMO system when it modeled transmission of four spatial streams to two client devices each comprising two receiver antennas.

In the example of FIG. 4, as noted above, an ideal channel feedback model was used by the simulated DL MU-MIMO system to obtain the resulting probability distribution function. In the example of FIG. 4, the ideal channel feedback model assumed that a network device may use channel feedback measured at the receiver antennas of the client devices to determine antenna weights during DL MU-MIMO transmission, without accounting for impairments to the channel feedback. As shown in FIG. 4, based on this ideal channel feedback model, the simulated DL MU-MIMO system had a higher throughput capacity probability when it was modeled to transmit four spatial streams to two client devices each having two receiver antennas (as shown by curve 415), as compared to when it was modeled to transmit three spatial streams to three client devices each having two receiver antennas (as shown by curve 410), or as compared to when it was modeled to transmit three spatial streams to three client devices each having one receiver antenna (as shown by curve 405.)

However, for an actual network device, there are several sources of impairments affecting the quality of channel feedback when using DL MU-MIMO. First, channel feedback may change, from a time when the network device measures channel feedback of a spatial stream at a receiver antenna of a client device, to a time when the network device transmits one or more data packets applying antenna weights based on the measured channel feedback. This discrepancy between channel feedback at the time of measurement and channel feedback at the time of transmission can degrade DL MU-MIMO throughput capacity. Second, for an actual network device, channel feedback is quantized and compressed before being transmitted by the network device, which can result in distortion of the channel feedback. Third, depending on a signal-to-noise ratio of a signal received at a receiver antenna of a client device, there will likely be some amount of noise during channel feedback measurements by the client device. Thus, for an actual network device, during transmission of spatial streams, impairments affecting the quality of the channel feedback may cause interference between the spatial streams which are unaccounted for under the ideal channel feedback model. This interference may result in data packet loss during transmission of the spatial streams, which in turn, may reduce throughput capacity of an actual network device as compared to the simulated DL MU-MIMO system using the ideal channel feedback model.

Figure 5:
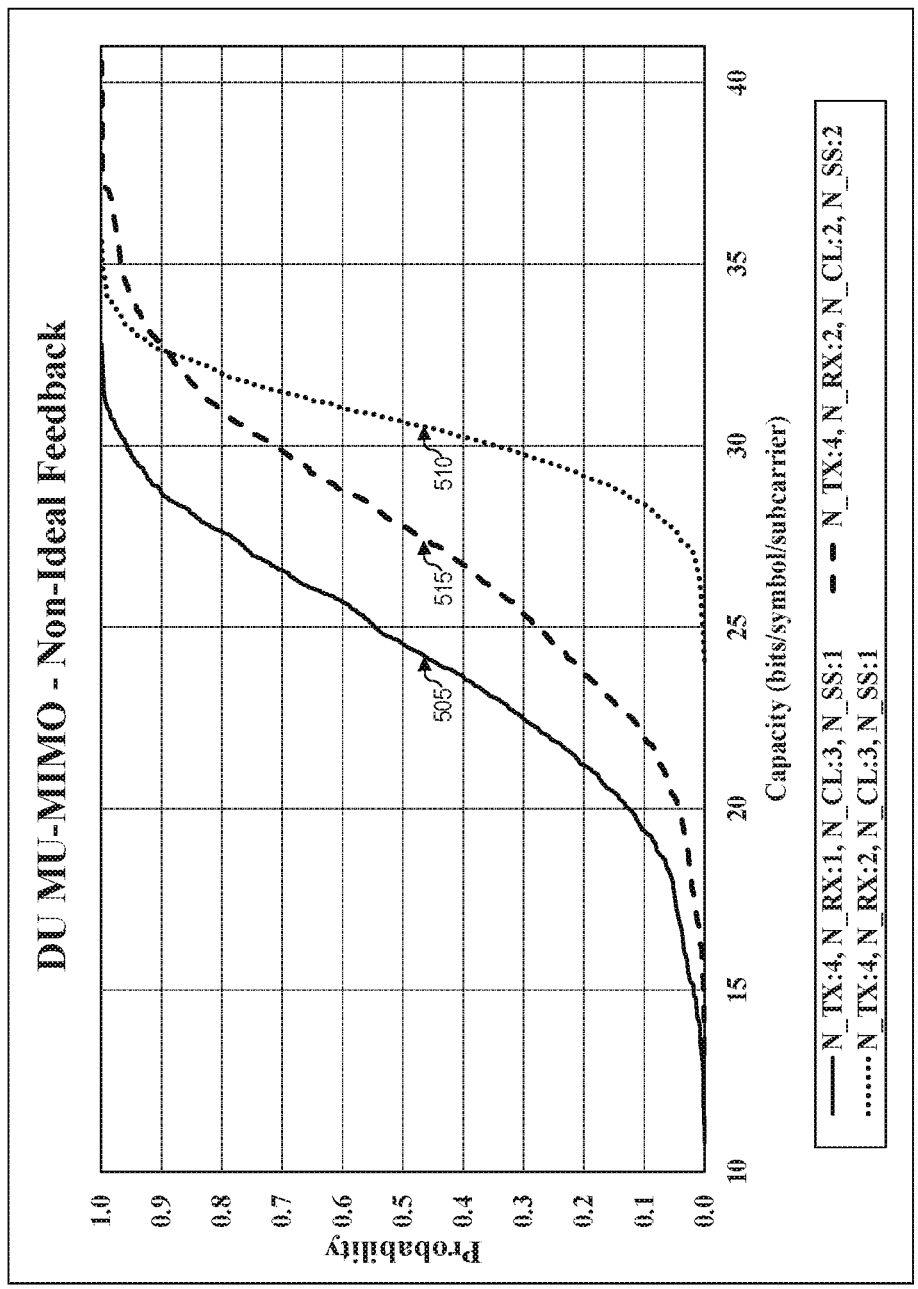
FIG. 5 is a graph which shows a probability distribution function of an example simulated DL MU-MIMO system using a non-ideal channel feedback model.

FIG. 5 is a graph 500 which shows a probability distribution function of a simulated DL MU-MIMO system using a non-ideal channel feedback model. Like the example of FIG. 4, the probability distribution function shown in FIG. 5 is measured as a probability of throughput capacity of the simulated DL MU-MIMO system versus throughput capacity of the simulated DL MU-MIMO system. However, unlike the example of FIG. 4, which modeled channel feedback without accounting for impairments which affect the quality of channel feedback, in the example of FIG. 5, the simulated DL MU-MIMO system modeled channel feedback to account for impairments which affect the quality of channel feedback. Curve 505 represents a probability distribution function of throughput capacity obtained by the simulated DL MU-MIMO system when it modeled transmission of three spatial streams to three client devices each comprising one receiver antenna. Curve 510 represents a probability distribution function of throughput capacity obtained by the simulated DL MU-MIMO system when it modeled transmission of three spatial streams to three client devices each comprising two receiver antennas. Curve 515 represents a probability distribution function of throughput capacity obtained by the simulated DL MU-MIMO system when it modeled transmission of four spatial streams to two client devices each comprising two receiver antennas.

As shown in FIG. 5, the probability distribution function of the simulated DL MU-MIMO system, which modeled impairments which affect the quality of channel feedback, resembles the CDF results obtained by the network device when using Default DL MU-MIMO, as shown in FIG. 3. Moreover, in the example of FIG. 5, when the simulated DL MU-MIMO system was modeled to transmit multiple spatial streams to multiple client devices, the simulated DL MU-MIMO system increased throughput capacity when it was modeled to transmit one spatial stream to each of three client devices each comprising two receiver antennas (as shown by curve 510), as compared when it was modeled to transmit two spatial streams to each of two client devices each comprising two receiver antennas (as shown by curve 515.) Thus, it was discovered that when a network device uses DL MU-MIMO to transmit multiple spatial streams to multiple client devices, the network device may mitigate interference caused by channel feedback impairments when each client device has at least one receiver antenna that is not assigned a spatial stream.

Figure 6:
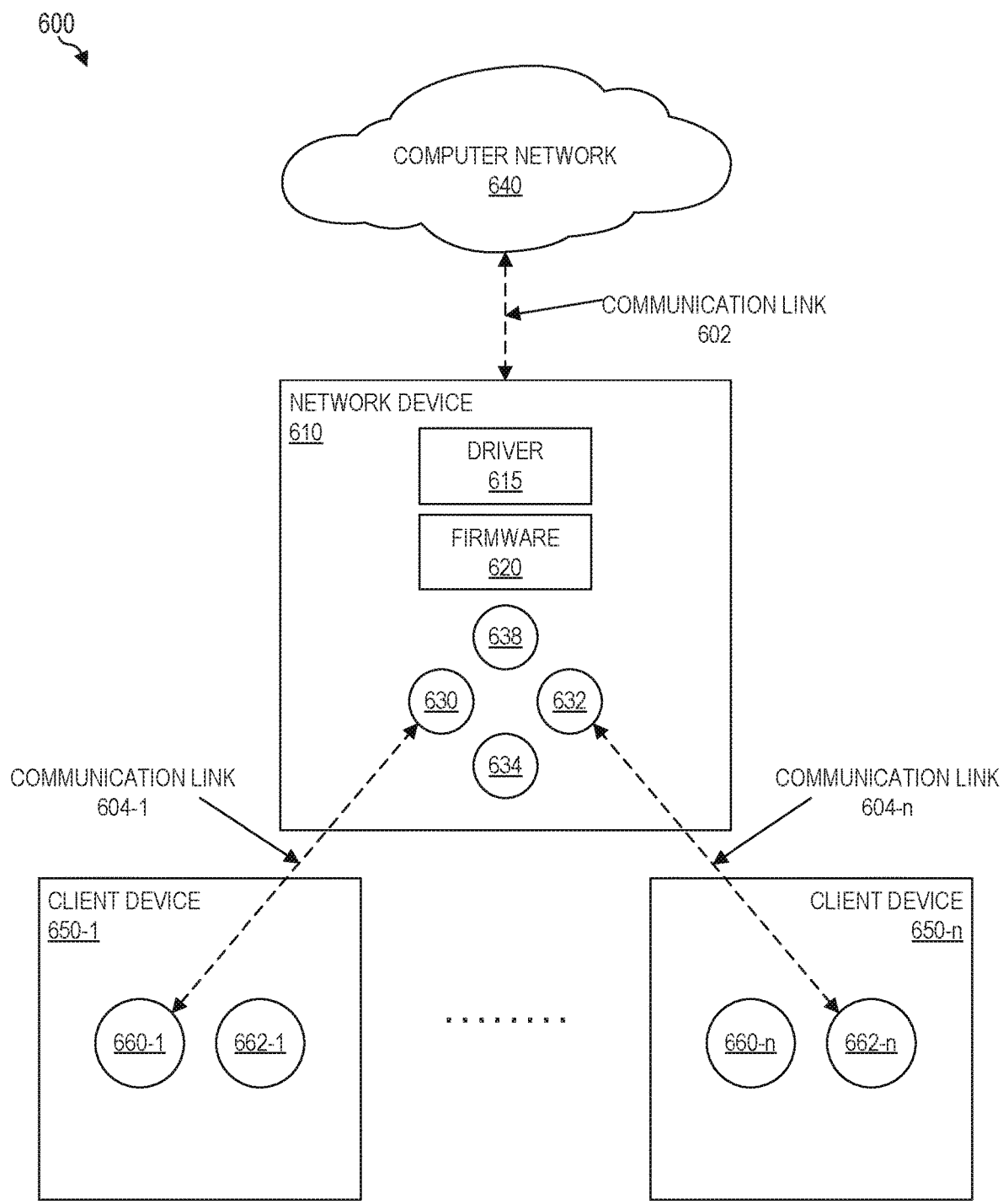
FIG. 6 is a block diagram of an example system for enhanced client grouping by an example network device.

FIG. 6 is a block diagram of an example system 600 for enhanced client grouping by network device 610. In the example of FIG. 6, system 600 may include network device 610, computer network 640, and a plurality of client devices 650-1 to 650-n. In the example of FIG. 6, driver 615 and firmware 620 may execute on network device 610. Driver 615 and firmware 620 may comprise one or more instructions stored on at least one non-transitory machine-readable storage medium which are executable by at least one processing resource.

In examples described herein, network device 610 may be, for example, a wireless access point (WAP). In such examples, network device 610 may engage in any network data transmission operations, including, but not limited to, switching, routing, bridging, or a combination thereof. A WAP generally refers to receiving points for any known or convenient wireless access technology which may later become known. Specifically, the term WAP is not intended to be limited to IEEE 802.11-based WAPs. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 610 may be any suitable type(s) of network devices made by any suitable vendor(s). It will be understood by one of ordinary skill in the art that a network device execute any suitable type(s) of computer software, now known or later developed.

In examples described herein, network device 610 may transmit and receive Wi-Fi signals that conform to the IEEE 802.11ac standard at a frequency range of 5 GHz. In some examples, network device 610 may transmit and receive Wi-Fi signals that conform to the IEEE 802.11ax standard at a frequency range of 2.4 GHz, at a frequency range of 5 GHz, or a combination thereof. However, it will be understood by one skilled in the art that network device 610 may transmit and receive wireless signals that conform to any suitable type(s) of wireless communications standard(s) and/or operate at any suitable frequency range(s).

In the example of FIG. 6, network device 610 may comprise a plurality of transmitter antennas 630, 632, 634, and 638. Moreover, network device 610 may support group sizes of client devices of up to the total number of transmitter antennas per group. That is, network device 610 may support group sizes of up to four client devices per group. Although FIG. 6 shows that network device 610 has four transmitter antennas 630, 632, 634, and 638, it will be understood by one skilled in the art that network device 610 may comprise any suitable number of transmitter antennas. Moreover, although network device 610 may support group sizes of client devices of up to the total number of transmitter antennas per group, it will be understood by one skilled in the art that network device 610 may support any suitable group sizes (e.g., the network device may support group sizes of client devices of up to less than the total number of transmitter antennas per group.)

In the example of FIG. 6, each of the plurality of client devices 650-1 to 650-n may comprise a wireless communication device. In such example, one or more client devices 650-1 to 650-n may each comprise a computing device, such as, for instance, a smartphone, a laptop, a tablet, a client or host device, a server device, or the like. In such example, each of one or more client devices 650-1 to 650-n may establish one or more communication links 604-1 to 604-n with network device 610. Although only two client devices are shown in FIG. 6, it will be understood that system 600 may include any suitable number of client devices. That is, in the example of FIG. 6, any suitable number of client devices may be associated with network device 610. In the example of FIG. 6, one or more client devices 650-1 to 650-n comprise a plurality of first receiver antennas 660-1 to 660-n and a plurality of second receiver antennas 662-1 to 662-n, such that each client device comprises one first receiver antenna and one second receiver antenna. Although FIG. 6 shows that each client device has one first receiver antenna and one second receiver antenna, it will be understood by one skilled in the art that one or more client devices 650-1 to 650n may have any suitable number(s) of receiver antennas.

In the example of FIG. 6, communication links 602 and 604-1 to 604-n allow communication between devices of system 600. As shown in FIG. 6, communication link 602 allows communication between network device 610 and computer network 640. In the example of FIG. 6, communication links 604-1 to 604-n may provide communication between one of more transmitter antennas 630, 632, 634, and 638 and one or more first receiver antennas 660-1 to 660-n and one or more second receiver antennas 662-1 to 662-n. In examples described herein, communication between at least two devices of system 600 may comprise sending or receiving of signals (e.g., transmitting data) between the at least two devices. In examples described herein, communication between at least two devices of system 600 may comprise direct or indirect communication between the at least two devices.

In such example, communication links 602 and 604-1 to 604-n may use any suitable data transmission protocol(s), including at least one connection-oriented protocol such as Transmission Control Protocol (TCP), at least one connectionless protocol such as User Datagram Protocol (UDP), or the like, or a combination thereof. It will be understood by one skilled in the art that communication links 602 and 604-1 to 604-n may use any suitable type(s) of data transmission protocol(s), now known or later developed. In such example, communication link 602 may comprise at least one wired link, such as a wire, a cable, an optical fiber, or the like, or a combination thereof. Alternatively, communication link 602 may comprise at least one wireless link, such as a Wi-Fi link, a cellular link, or the like, or a combination thereof. Alternatively, communication link 602 may comprise a combination of at least one wired link and at least one wireless link. It will be understood by one skilled in the art that communication link 602 may use any suitable type(s) of wired and/or wireless link(s), now known or later developed. In some examples, each of communication links 604-1 to 604-n may comprise at least one wireless link such as a Wi-Fi link, or the like. It will be understood by one skilled in the art that each of communication links 604-1 to 604-n may use any suitable type(s) of wireless link(s), now known or later developed.

In the example of FIG. 6, network device 610 may establish a communication link 602 with computer network 640. In examples described herein, computer network 640 may include, for example, a local area network (LAN), a virtual LAN (ULAN), a wireless local area network (WLAN), a virtual private network (VPN), a wide area network (WAN), the Internet, or the like, or a combination thereof, In examples described herein, a WAN may comprise, for example, a wired WAN, wireless WAN, hybrid WAN, software-defined WAN (SD-WAN), or the like, or any combination thereof. It will be understood by one skilled in the art that computer network 640 may comprise any suitable type(s) of computer network(s).

In the example of FIG. 6, network device 610 may transmit data packets, by one or more transmitter antennas 630, 632, 634, and 638, to one or more first receiver antennas 660-1 to 660-n and to one or more second receiver antennas 662-1 to 662-n of one or more client devices 650-1 to 650-n. In such example, network device 610 may transmit data packets to one or more client devices 650-1 to 650-n using a DL SU-MIMO scheme, a DL MU-MIMO scheme, or a combination thereof.

In the example of FIG. 6, network device 610 may provide enhanced client grouping of client devices 650-1 to 650-n. Network device 610 may determine that one or more client devices 650-1 to 650-n are associated with network device 610. Network device 610 may group one or more client devices 650-1 to 650-n into one or more groups, based on a determination that one or more client devices 650-1 to 650-n are associated with network device 610. For example, network device 610 may group one or more client devices 650-1 to 650-n into one group, based on a determination that the total number of client devices associated with network device 610 is less than or equal to the total number of transmitter antennas of network device 610. In another example, network device 610 may group one or more client devices 650-1 to 650-n into a plurality of groups, such that no more than one of the groups has a different number of client devices than the total number of transmitter antennas of network device 610, based on a determination that the total number of client devices associated with network device 610 is greater than the total number of transmitter antennas of network device 610.

In the example of FIG. 6, network device 610 may assign, for each group of one or more client devices 650-1 to 650-n, one spatial stream to one receiver antenna (e.g., the first receiver antenna) of each client device. In such example, network device 610 may assign one spatial stream to each of a portion of the remaining receiver antennas (e.g., a portion of the second receiver antennas) of the group, based on a determination that the number of client devices for the group is less than a number of transmitter antennas for the group, and based on a determination that the number of client devices of the group is greater than one. In such example, network device 610 may assign one spatial stream to each receiver antenna of the remaining receiver antennas of the group, based on a determination that the number of client devices of the group is equal to one. In such example, network device 610 may transmit each spatial stream assigned to the group.

In this manner, network device 610 provides enhanced client grouping which may increase throughput over prior approaches when using a DL MU-MIMO scheme. For example, network device 610 may provide, for each group having two or more client devices 650-1 to 650-n, at least one receiver antenna that is not assigned a spatial stream, and thus, can cancel interference caused by channel feedback impairments during DL MU-MIMO transmission of each spatial stream assigned to the group. Accordingly, in such example, for client counts of two client devices and eight or more client devices, network device 610 may increase throughput when using Enhanced DL MU-MIMO, as compared to when using Default DL MU-MIMO. Moreover, network device 610 may assign one spatial stream to each receiver antenna of the remaining receiver antennas of the group, based on a determination that the number of client devices of the group is equal to one. Accordingly, for a client count of one client device, network device 610 may avoid decreased throughput when using Enhanced DL MU-MIMO as compared to when using Default DL MU-MIMO or DL SU-MIMO.

Figure 7:
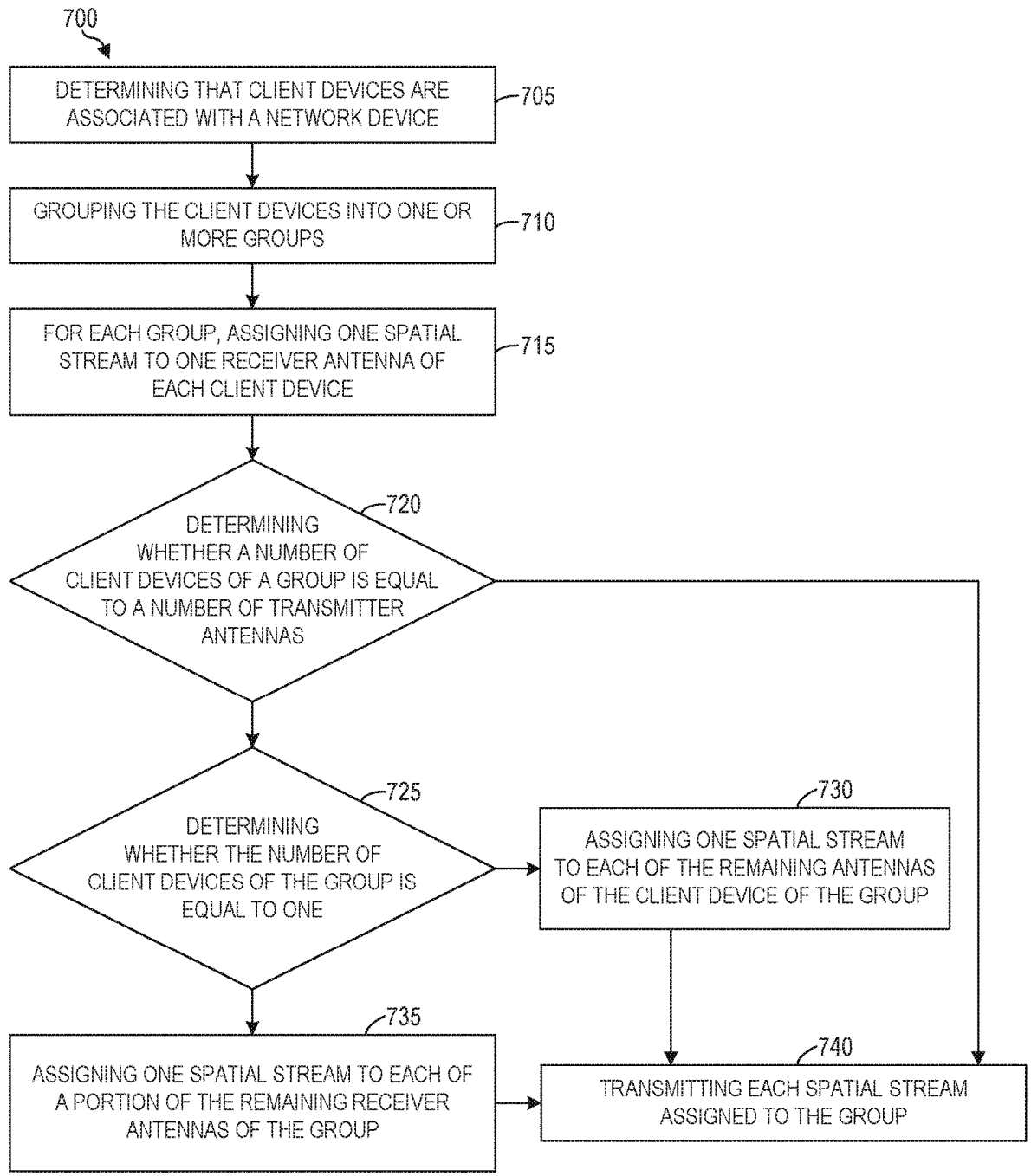
FIG. 7 is a flowchart of an example process of enhanced client grouping by an example network device.

FIG. 7 illustrates functionality 700 for a network device, according to one example. Functionality 700 may be implemented as a method or may be executed as one or more instructions on a machine (e.g., by at least one processor), where the one or more instructions are included on at least one machine-readable storage medium (e.g., a transitory or non-transitory machine readable-storage medium.) While only eight blocks are shown in functionality 700, functionality 700 may include other actions described herein. Also, some of the blocks shown in functionality 700 may be omitted without departing from the spirit and scope of this disclosure. Functionality 700 may be implemented on a network device according to any of the examples herein.

As shown in block 705, functionality 700 includes determining that client devices are associated with a network device.

In some examples, the network device may determine that client devices are associated with the network device. In such examples, the network device may determine, via one or more communication links, that the client devices are associated with the network device. In such examples, the network device may determine that the client devices are associated with the network device by receiving, via one or more communication links, one or more signals from the client devices. In such examples, the network device may determine a total number of client devices that are associated with the client device.

In some examples, each of the client devices may comprise a plurality of receiver antennas. In such examples, each of the client devices may have DL MU-MIMO functionality. In such examples, each of the client devices may have DL SU-MIMO functionality.

As shown in block 710, functionality 700 includes grouping the client devices into one or more groups.

In some examples, the network device may group the client devices into one or more groups. In such examples, the client devices may be grouped so that each group comprises a number of client devices less than or equal to a total number of transmitter antennas of the network device. In such examples, the client devices may be grouped into one group, based on a determination that the total number of client devices associated with the network device is less than or equal to the total number of transmitter antennas of the network device. For instance, when a network device comprises four transmitter antennas, and three client devices are associated with the network device, the network device may group the client devices into one group comprising three client devices. In such examples, the client devices may be grouped into a plurality of groups, so that no more than one of the groups has a different number of client devices than a number of transmitter antennas of the network device, based on a determination that the total number of client devices associated with the network device is greater than the number of transmitter antennas. For instance, when a network device comprises four transmitter antennas, and nine client devices are associated with the network device, the network device may group the client devices into two groups each comprising four client devices and one group comprising one client device. In such examples, the network device may group the client devices into one or more groups, based on group sizes of client devices supported by the network device. For instance, for a network device comprising four transmitter antennas and supporting group sizes of up to three client devices per group, when nine client devices are associated with the network device, the network device may group the client devices into three groups each comprising three client devices.

In some examples, grouping the client devices into one or more groups may comprise determining, for at least one group, a number of client devices for the group, based on a prediction of a quality of channel feedback to transmit each spatial stream assigned to the number of client devices for the group. In such examples, the quality of channel feedback may be predicted based on modeling, by the network device, channel feedback for transmitting at least one spatial stream to the number of client devices for the group. In such examples, the quality of channel feedback may be based on client type, channel feedback delay, CSI, or a combination thereof.

In some examples, grouping the client devices into one or more groups may comprise determining, for at least one group, a number of client devices for the group, based on a determination of a quality of channel feedback to transmit at least one signal, by the network device, to one or more client devices of the at least one group. In such examples, the quality of channel feedback may be determined based on transmitting, by the network device, at least one signal to one or more receiver antennas of one or more client devices associated with the network device, and measuring, at the one or more of the client devices, the quality of channel feedback of at least one signal received at the one or more receiver antennas of the one or more of the client devices. In such examples, the quality of channel feedback may be based on client type, channel feedback delay, CSI, or a combination thereof.

In some examples, network device may regroup the client devices into one or more groups. In such examples, the client devices may be regrouped into the one or more groups after a predetermined time period. In such examples, the client devices may be regrouped based on a determination that the network device has transmitted at least one spatial stream to one or more groups of the client devices. In such examples, the client devices may be regrouped based on one or more data types to be transmitted by the network device to one or more client devices, queue depth of instructions to transmit data by the network device to one or more client devices, client type(s) of one or more client devices, channel feedback delay at one or more client devices, CSI at one or more client devices, or a combination thereof, In such examples, the client devices may be regrouped based on a determination of airtime fairness between one or more client devices.

In examples described herein, queue depth is a number of pending instructions to be processed by a network device, In such examples, queue depth may be based on a number of pending instructions stored at the network device, a number of pending instructions stored at another device associated with the network device, or a combination thereof. In such examples, the pending instructions may comprise instructions to transmit, by the network device, at least one signal (e.g., at least one spatial stream) to one or more client devices.

In examples described herein, airtime fairness is an allocation of time, by a network device, to transmit data to one or more client devices associated with the network device. In such examples, airtime fairness may be based on a throughput capacity of one or more client devices, the quality of channel feedback at one or more client devices, channel feedback delay at one or more client devices, CSI at one or more client devices, or a combination thereof, As shown in block 715, functionality 700 includes, for each group, assigning one spatial stream to one receiver antenna of each client device.

In some examples, the network device may assign, for each group, one spatial stream to one receiver antenna of each client device of the group. In such examples, the network device may determine the one receiver antenna of each client device of the group based on a prediction of a quality of channel feedback received by the one receiver antenna of one or more client devices of the group. In such examples, the quality of channel feedback received by the one receiver antenna may be predicted based on modeling, by the network device, channel feedback for transmitting at least one spatial stream to the one receiver antenna of one or more client devices of the group. In such examples, the network device may determine the one receiver antenna of each client device of the group based on a determination of a quality of channel feedback received by the one receiver antenna of one or more client devices of the group. In such examples, the quality of channel feedback may be determined by transmitting, by the network device, at least one signal to the one receiver antenna of one or more client devices of the group, and measuring, at the one receiver antenna of one or more client devices of the group, the quality of channel feedback of at least one signal received at the one receiver antenna of one or more client devices of the group. In such examples, the quality of channel feedback may be based on client type of one or more client devices of the group, channel feedback delay at one or more client devices of the group, CSI at one or more client devices of the group, or a combination thereof. In such examples, the network device may determine the one receiver antenna of each client device of the group based on queue depth of instructions to transmit data by the network device to one or more client devices of the group, a determination of airtime fairness between one or more client devices of the group, or a combination thereof.

In some examples, the network device may reassign, for each group, one spatial stream to one receiver antenna of each client device of the group. In such examples, each of the one spatial streams may be reassigned after a predetermined time period. In such examples, each of the one spatial streams may be reassigned based one or more data types to be transmitted by the network device to one or more client devices of the group, queue depth of instructions to transmit data by the network device to one or more client devices of the group, client type(s) of one or more client devices of the group, channel feedback delay at one or more client devices of the group, CSI at one or more client devices of the group, or a combination thereof. In such examples, each of the one spatial streams may be reassigned based on a determination of airtime fairness between one or more client devices of the group.

As shown in block 720, functionality 700 includes determining whether a number of client devices for a group is equal to a number of transmitter antennas.

In some examples, the network device may determine whether a number of client devices for the group is equal to a total number of transmitter antennas of the network device. In such examples, the network device may determine, via one or more communications links, whether the number of client devices for the group is equal to the total number of transmitter antennas.

At block 720, if it is determined that the number of client devices of the group is equal to a number of transmitter antennas, then functionality 700 proceeds to block 740. At block 720, if it is determined that the number of client devices of the group not equal to a number of transmitter antennas (i.e., the number of client devices of the group is less than the total number of transmitter antennas), then functionality 700 proceeds to block 725.

As shown in block 725, functionality 700 includes determining whether the number of client devices of the group is equal to one.

At block 725, if it is determined that the number of client devices of the group is equal to one, then functionality 700 proceeds to block 730. At block 725, if it is determined that the number of client devices of the group is not equal to one (i.e., the number of client devices of the group is greater than one), then functionality 700 may proceed to block 735.

As shown in block 730, functionality 730 includes assigning one spatial stream to each of the remaining receiver antennas of the client device of the group.

In some examples, the network device may assign the one spatial stream to each of the remaining receiver antennas of the client device of the group.

As shown in block 735, functionality 700 includes assigning one spatial stream to each of a portion of the remaining receiver antennas of the group.

In some examples, the network device may determine the portion of the remaining receiver antennas of the group. In such examples, the portion of the remaining receiver antennas may be determined based on a prediction of a quality of channel feedback by one or more of the portion of the remaining receiver antennas of the group. In such examples, the quality of channel feedback may be predicted by modeling, by the network device, channel feedback for transmitting at least one spatial stream to one or more of the portion of the remaining receiver antennas of the group. In such examples, the portion of the remaining receiver antennas may be determined based on a determination of a quality of channel feedback at one or more of the portion of the remaining receiver antennas of the group. In such examples, the quality of channel feedback may be determined by transmitting, by the network device, at least one signal to one or more of the portion of the remaining receiver antennas of the group, and measuring, at one or more of the portion of the remaining receiver antennas of the group, the quality of channel feedback of at least one signal received at one or more of the portion of the remaining receiver antennas of the group. In such examples, the quality of channel feedback may be based on client type of one or more client devices of the group, channel feedback delay at one or more client devices of the group, CSI at one or more client devices of the group, or a combination thereof. In such examples, the network device may determine a portion of the remaining receiver antennas of the group based on queue depth of instructions to transmit data by the network device to one or more client devices of the group, a determination of airtime fairness between one or more client devices of the group, or a combination thereof.

In some examples, the network device may reassign one spatial stream to each of a portion of the remaining receiver antennas of the group. In such examples, each of the one spatial streams may be reassigned after a predetermined time period. In such examples, each of the one spatial streams may be reassigned based on one or more data types to be transmitted by the network device to one or more client devices of the group, queue depth of instructions to transmit data by the network device to one or more client devices of the group, client type(s) of one or more client devices of the group, channel feedback delay at one or more client devices of the group, CSI at one or more client devices of the group, or a combination thereof. In such examples, each of the one spatial streams may be reassigned based on a determination of airtime fairness between one or more client devices of the group.

As shown in block 740, functionality 700 includes transmitting each spatial stream assigned to the group.

In some examples, the network device may transmit each spatial stream assigned to the group. In such examples, each spatial stream assigned to the group may be transmitted by transmitting, by each of the transmitter antennas, one of the spatial streams to the assigned one of the receiver antennas of the group. In such examples, each spatial stream assigned to the group may be transmitted simultaneously.

In some examples, transmitting each spatial stream assigned to the group comprises cancelling interference by the at least one receiver antenna of the group that is not assigned a spatial stream. In such examples, interference may be cancelled by beamforming, by the network device, at least one spatial stream assigned to the group. In such examples, beamforming at least one spatial stream assigned to the group may be performed by at least one transmitter antenna of the network device, at least one receiver antenna of the group, or a combination thereof. In such examples, interference may be cancelled by determining, by the network device, at least one antenna weight for at least one receiver antenna of the group, based on at least one signal received by the at least one receiver antenna of the group, and applying, by the network device, the at least one antenna weight to the at least one receiver antenna of the group. In such example, at least antenna weight for at least one receiver antenna of the group may be determined based on a quality of channel feedback of at least one signal received by the at least one receiver antenna of the group, channel feedback delay of at least one signal received by the at least one receiver antenna of the group, CSI of at least one signal received by the at least one receiver antenna of the group, or a combination thereof.

In examples described herein, beamforming, i.e., spatial filtering, refers to a signal processing technique for directional signal transmission, directional signal reception, or a combination thereof, In such examples, beamforming may comprise combining two or more signals such that they experience constructive interference, destructive interference, or a combination thereof. In such examples, beamforming may control phase and amplitude of at least one signal transmitted by at least one transmitter antenna of the network device, to generate constructive interference, destructive interference, or a combination thereof, of the at least one signal, It will be understood that one skilled in the art may employ any suitable type(s) of beamforming, now known or later developed.

In this manner, functionality 700 may provide enhanced client grouping by a network device over prior approaches when using a DL MU-MIMO scheme. For example, at block 735, functionality 700 may include assigning one spatial stream to each of a portion of the remaining receiver antennas for the group, wherein at least one receiver antenna of the group is not assigned a spatial stream, based on determining, at block 725, that the number of client devices of the group is greater than one. Accordingly, in such example, for client counts two client devices and eight or more client devices, functionality 700 provides Enhanced DL MU-MIMO which may increase throughput when transmitting, at block 740, each spatial stream assigned to the group, as compared to when using Default DL MU-MIMO. Moreover, functionality 700 may include assigning, at block 730, one spatial stream to each of the remaining receiver antennas of the client device of the group, based on determining, at block 725, that the number of client devices of the group is equal to one. Accordingly, in such example, for a client count of one client device, functionality 700 provides Enhanced DL MU-MIMO which may avoid decreased throughput when transmitting, at block 740, each spatial stream assigned to the group, as compared to when using Default MU-MIMO or SU MU-MIMO.

Figure 8:
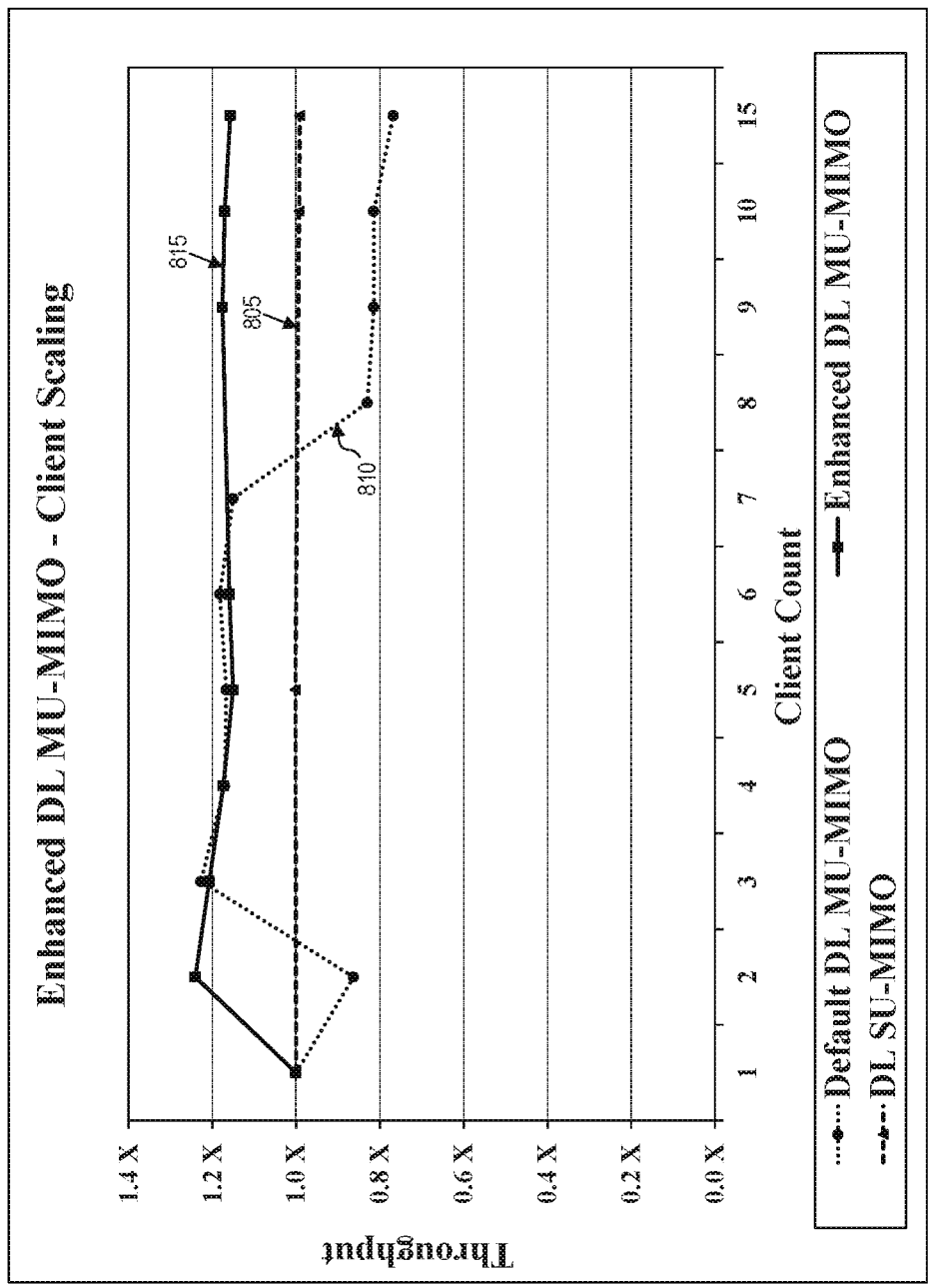
FIG. 8 is a chart which shows enhanced client scaling of an example network device.

FIG. 8 is a graph 800 showing enhanced client scaling for an example network device using Enhanced DL MU-MIMO, according to the present invention.

As shown in FIG. 8, client scaling is measured as throughput of the network device versus client count of client devices associated with the network device. Similar to the example of FIG. 1, in the example of FIG. 8, throughput values of the network device are shown as relative values based on scale factor X, which, as explained above in relation to FIG. 1, may have units corresponding to a data rate such as Mbps, or the like. In the example of FIG. 8, client scaling results were obtained by transmitting, by the network device, data packets to various client counts of client devices, and then measuring throughput of the network device. The client devices which were used to obtain the client scaling results shown in FIG. 8 each comprised two receiver antennas and had DL SU-MIMO functionality and DL MU-MIMO functionality. Curve 805 represents client scaling results obtained by the network device when using DL SU-MIMO. Curve 810 represents client scaling results obtained by the network device when using Default DL MU-MIMO. Curve 815 represents client scaling results obtained by the network device when using Enhanced DL MU-MIMO.

In the example of FIG. 8, the network device performed grouping of client devices so that no more than one of the groups had a different number of client devices than three client devices, because the network device supported group sizes of up to three client devices per group. In the example of FIG. 8, for each group, the network device assigned one spatial stream to one receiver antenna for each client device of the group. Moreover, in the example of FIG. 8, for each group, based on a determination, by the network device, that the number of client devices was equal to one, the network device assigned one spatial stream to each of the remaining receiver antennas of the group. Moreover, in the example of FIG. 8, for each group, based on a determination, by the network device, that the number of client devices was greater than one and less than the total number of transmitter antennas (four transmitter antennas), the network device assigned one spatial stream to each of a portion of the remaining receiver antennas of the group, wherein at least one receiver antenna of the group was not assigned a spatial stream. For example, for each group having two client devices, the network device assigned one spatial stream to one receiver antenna of one of the client devices, and assigned two spatial streams to two receiver antennas of the other one of the client devices.

In the example of FIG. 8, for a client count of one client device, the network device achieved throughput of about 1.0 X when using Enhanced DL MU-MIMO (as shown by curve 815), which was similar to throughput achieved when using either DL SU-MIMO (as shown by curve 805) or Default DL MU-MIMO (as shown by curve 810.) Therefore, for a client count of one client device, it was discovered that a network device using Enhanced DL MU-MIMO may have similar throughput as compared to when using DL SU-MIMO or Default DL MU-MIMO, and moreover, may avoid decreased throughput as compared to when using DL SU-MIMO or Default DL MU-MIMO. For a client count of two client devices, the network device achieved throughput of about 1.2 X when using Enhanced DL MU-MIMO, as compared to throughput of about 0.86 X when using Default DL MU-MIMO. Therefore, for a client count of two client devices, it was discovered that a network device using Enhanced DL MU-MIMO may have increased throughput as compared to when using either DL MU-MIMO or Default DL MU-MIMO, and moreover, may avoid decreased throughput as compared to when using Default DL MU-MIMO. For client counts of three to seven client devices, throughput of the network device remained about constant at about 1.2 X when using Enhanced DL MU-MIMO, which was similar to the throughput achieved by the network device when using Default DL MU-MIMO. Thus, for client counts of three to seven client devices, it was discovered that a network device may have similar throughput using Enhanced DL MU-MIMO as compared to when using Default DL MU-MIMO, and moreover, may have improved throughput as compared to when using DL SU-MIMO. For client counts of eight or more client devices, throughput of the network device using Enhanced DL MU-MIMO remained about constant at about 1.2 X, whereas throughput for the network device decreased from about 0.83 X for eight client devices down to about 0.77 X for fifteen client devices when using Default DL MU-MIMO, and remained about constant at about 0.99 X when using SU MU-MIMO. Thus, for client counts of eight or more client devices, it was discovered that a network device using Enhanced DL MU-MIMO may have increased throughput as compared to when using either DL SU-MIMO or Default MU-MIMO, and moreover, that a network device may avoid decreased throughput as compared to when using Default MU-MIMO.

FIGS. 9A to 9D show examples of enhanced client grouping by network device 910. As shown in FIGS. 9A to 9D, system 900 includes network device 910 and five client devices 950-1 to 950-5. Network device 910 comprises three transmitter antennas 930, 932, and 934, and supports group sizes of up to the number of transmitter antennas per group (i.e., up to three client devices per group). Client devices 950-1 to 950-5 comprise first receiver antennas 960-1 to 960-5 and second receiver antennas 962-1 to 962-5, wherein each client device comprises one first receiver antenna and one second receiver antenna. For ease of understanding, many aspects of system 900 are omitted in FIGS. 9A to 9D, but system 900 may include any element described in connection with system 600, above.

Figure 9A:
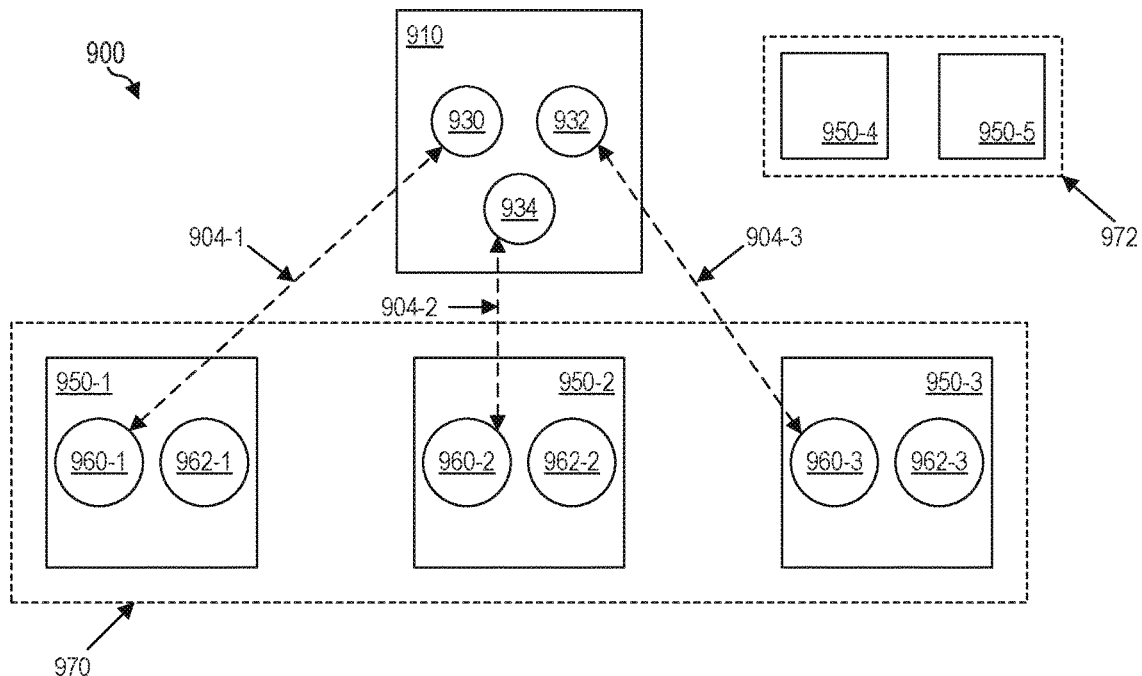
FIGS. 9A to 9D show examples of enhanced client grouping by an example network device.
Figure 9B:
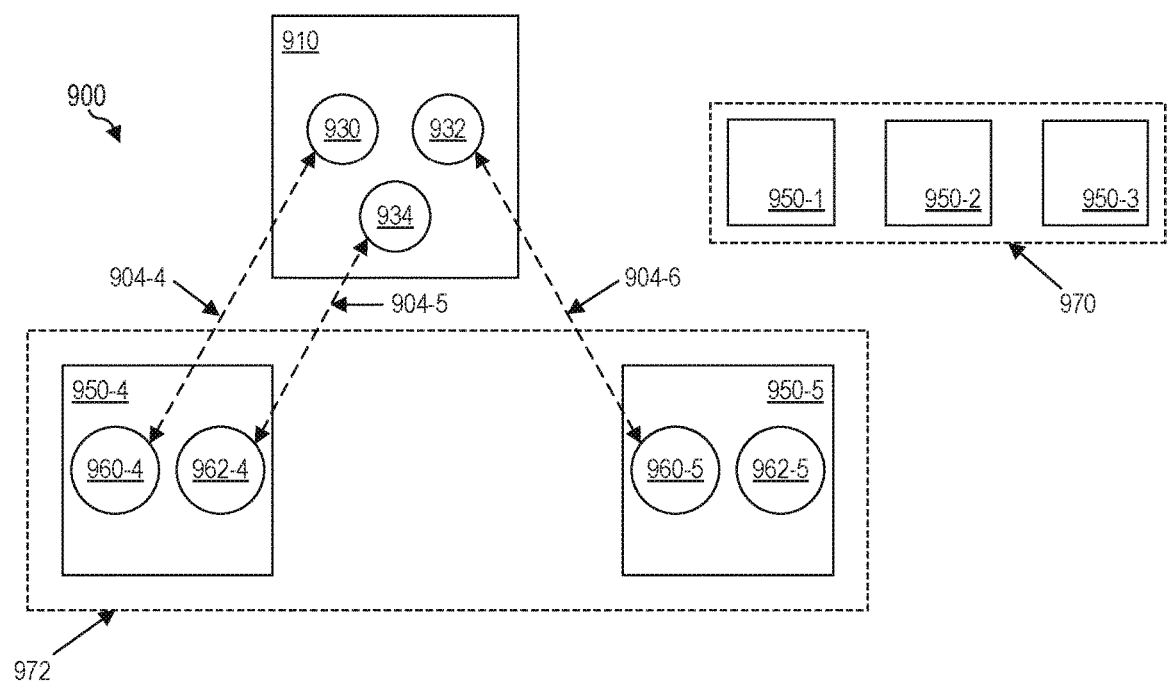

In the example of FIGS. 9A and 9B, network device 910 may group client devices 950-1 to 950-5 into one or more groups, so that each group comprises a number of client devices less than or equal to a total number of transmitter antennas of the network device. For example, network device 910 may group client devices 950-1 to 950-5 into first group 970 and second group 972, so that no more than one of the groups (e.g., second group 972) has a different number of client devices than a total number of transmitter antennas (three transmitter antennas) of network device 910, based on a determination that the total number of client devices (e.g., five client devices) associated with network device 910 is greater than the total number of transmitter antennas. For instance, as shown in FIGS. 9A and 9B, network device 910 may group client devices 950-1 to 950-5 into first group 970 and second group 972, so that first group 970 comprises three client devices 950-1, 950-2, and 950-3, and second group 972 comprises two client devices 950-4 and 950-5, In the example of FIGS. 9A and 9B, network device 910 may assign one spatial stream to each client device of first group 970. For example, network device 910 may assign one spatial stream to first client device 950-1, one spatial stream to second client device 950-2, and one spatial stream to third client device 950-3.

In the example of FIGS. 9A and 9B, network device 910 may assign one spatial stream to each client device of second group 972. For example, network device 910 may assign one spatial stream to fourth client device 950-4, and one spatial stream to fifth client device 950-5. Furthermore, network device 910 may assign a spatial stream to each of a portion of the remaining receiver antennas of second group 972. For example, network device 910 may assign a second spatial stream to second receiver antenna 962-4 of fourth client device 950-4. To determine whether to assign a second spatial stream to second receiver antenna 962-4 of fourth client device 950-4, network device 910 may predict a quality of channel feedback to transmit each spatial stream assigned to the fourth client device 950-4 and fifth client device 950-5. That is, network device 910 may predict a quality of channel feedback to transmit two spatial streams to fourth client device 950 and one spatial stream to fifth client device 950-5. In such example, based on a determination that a quality of channel feedback to transmit one spatial stream to fourth client device 950-4 and one spatial stream to fifth client device 950-5 is greater than a quality of channel feedback to transmit two spatial streams to fourth client device 950-4 and one spatial stream to fifth client device 950-5, network device 910 may not to assign a second spatial stream to fourth client device 950-4. Moreover, in such example, based on a determination that a quality of channel feedback to transmit one spatial stream to fourth client device 950-4 and one spatial stream to fifth client device 950-5 is less than a quality of channel feedback to transmit two spatial streams to fourth client device 950-4 and one spatial stream to fifth client device 950-5, network device 910 may assign a second spatial stream to fourth client device 950-4.

In the example of FIGS. 9A and 9B, network device 910 may transmit, by transmitter antennas 930, 932, and 934, each spatial stream assigned to first group 970 of client devices 950-1, 950-2, and 950-3. For example, network device 910 may transmit, by first transmitter antenna 930, the one spatial stream assigned to first client device 950-1 to first receiver antenna 960-1 via first communication link 904-1. Moreover, network device 910 may transmit, by third transmitter antenna 934, the one spatial stream assigned to second client device 950-2 to first receiver antenna 960-2 via second communication link 904-2. Moreover, network device 910 may transmit, by second transmitter antenna 932, the one spatial stream assigned to third client device 950-3 to first receiver antenna 960-3 via third communication link 904-3. In such example, network device 910 may simultaneously transmit the spatial streams assigned to first group 970 of client devices 950-1, 950-2, and 950-3.

In the example of FIGS. 9A and 9B, network device 910 may transmit, by transmitter antennas 930, 932, and 934, each spatial stream assigned to second group 972 of client devices 950-4 and 950-5. For example, network device 910 may transmit, by first transmitter antenna 930, the first spatial stream assigned to fourth client device 950-4 to first receiver antenna 960-4 via fourth communication link 904-4. Moreover, network device 910 may transmit, by third transmitter antenna 934, the second spatial stream assigned to fourth client device 950-4 to second receiver antenna 962-4 via fifth communication link 904-5. Moreover, network device 910 may transmit, by second transmitter antenna 932, the one spatial stream assigned to fifth client device 950-5 to first receiver antenna 960-5 via sixth communication link 904-6. In the example of FIGS. 9A and 9B, network device 910 may simultaneously transmit the spatial streams assigned to second group 972 of client devices 950-4 and 950-5.

Figure 9C:
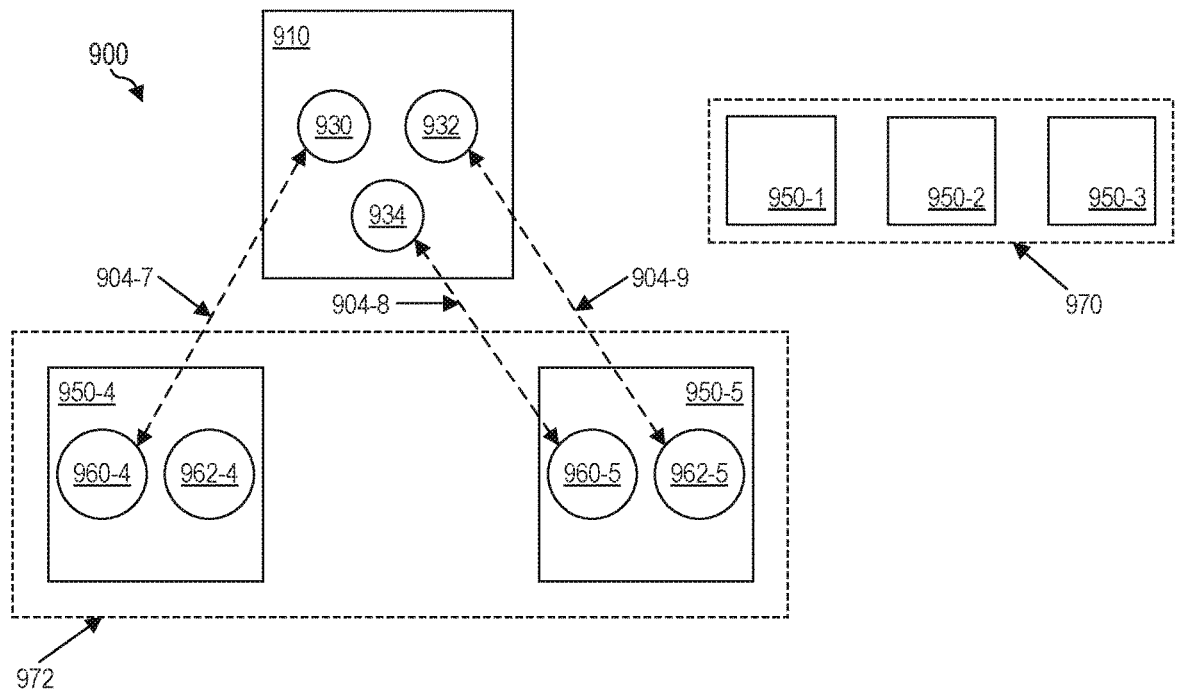

In the example of FIG. 9C, network device 910 may reassign one spatial stream to each client device of the second group 972. For example, network device 910 may reassign one spatial stream to fourth client device 950-4, and one spatial stream to fifth client device 950-5. In such example, network device 910 may reassign one spatial streams to each client device 950-4 and 950-5 of second group 972, for instance, after a predetermined time period, based on queue depth of data to be transmitted by network device 910 to client devices 950-4 and 950-5, based on a determination of airtime fairness between the client devices 950-4 and 950-5, or a combination thereof. In such example, network device 910 may reassign one spatial stream to each of a portion of the remaining receiver antennas of second group 972. For example, network device 910 may reassign one spatial stream to second receiver antenna 962-5 of fifth client device 950-5. In such example, network device 910 may reassign one spatial stream to second receiver antenna 962-5 of fifth client device 950-5, for instance, after a predetermined time period, based on queue depth of instructions to transmit data by network device 910 to client devices 950-4 and 950-5 of second group 972, based on a determination of airtime fairness between client devices 950-4 and 950-5 of second group 972, or a combination thereof. In the example of FIG. 9O, network device may transmit each spatial stream assigned to receiver antennas 960-4, 960-5, and 962-5 via communication links 904-7, 904-8, and 904-9.

Figure 9D:
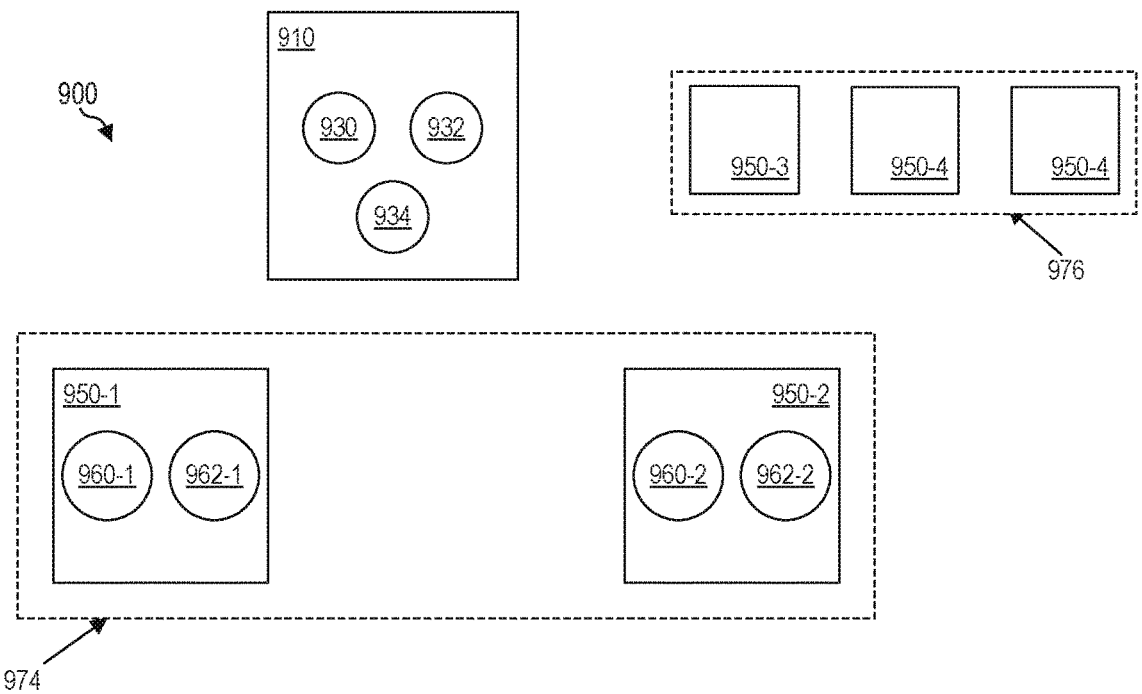

In the example of FIGS. 9D, network device 910 may regroup client devices 950-1 to 950-5 into one or more groups. For example, network device 910 may regroup client devices 950-1 to 950-5 into third group 974 comprising two client devices 950-1 and 950-2 and fourth group 976 comprising three client devices 950-3, 950-4, and 950-5. In such examples, network device 910 may regroup client devices 950-1 to 950-5 into third group 974 and fourth group 976, for instance, after a predetermined time period, based on queue depth of instructions to transmit data by network device 910 to client devices 950-1 to 950-5, based on a determination of airtime fairness between client devices 950-1 to 950-5, or a combination thereof. In the example of FIG. 9D, network device 910 may assign spatial streams to one or more groups of client devices 950-1 to 950-5 and transmit each spatial stream assigned to each group of client devices via a plurality of communication links.

In this manner, network device 910 provides enhanced client grouping which may increase throughput over prior approaches when using a DL MU-MIMO scheme. For example, in the example of FIGS. 9A and 9B, network device 910 may provide, for each of groups 970 and 972 of client devices 950-1 to 950-5, at least one receiver antenna that is not assigned a spatial stream and can thereby be used to cancel interference during DL MU-MIMO transmission of each spatial stream assigned to the group. Furthermore, in such example, network device 910 may assign a spatial stream to each of a portion of the remaining receiver antennas of second group 972, based on a prediction of a quality of channel feedback to transmit each spatial stream assigned to the fourth client device 950-4 and fifth client device 950-5. Accordingly, in such example, network device 910 may improve throughput when using Enhanced DL MU-MIMO as compared to when using Default DL MU-MIMO.

Moreover, in the example of FIG. 9C, network device 910 may reassign spatial streams to client devices 950-1 to 950-5, for instance, after a predetermined time period, based on queue depth of instructions to transmit data by network device 910 to client devices 950-4 and 950-5 of second group 972, based on a determination of airtime fairness between client devices 950-4 and 950-5 of second group 972, or a combination thereof. Furthermore, in the example of FIG. 9D, network device 910 may regroup client devices 950-1 to 950-5 into one or more groups, for instance, after a predetermined time period, based on queue depth of instructions to transmit data by network device 910 to client devices 950-1 to 950-5, based on a determination of airtime fairness between client devices 950-1 to 950-5, or a combination thereof. Accordingly, in such example, network device 910 may improve throughput when using Enhanced DL MU-MIMO as compared to when using Default DL MU-MIMO.

Figure 10A:
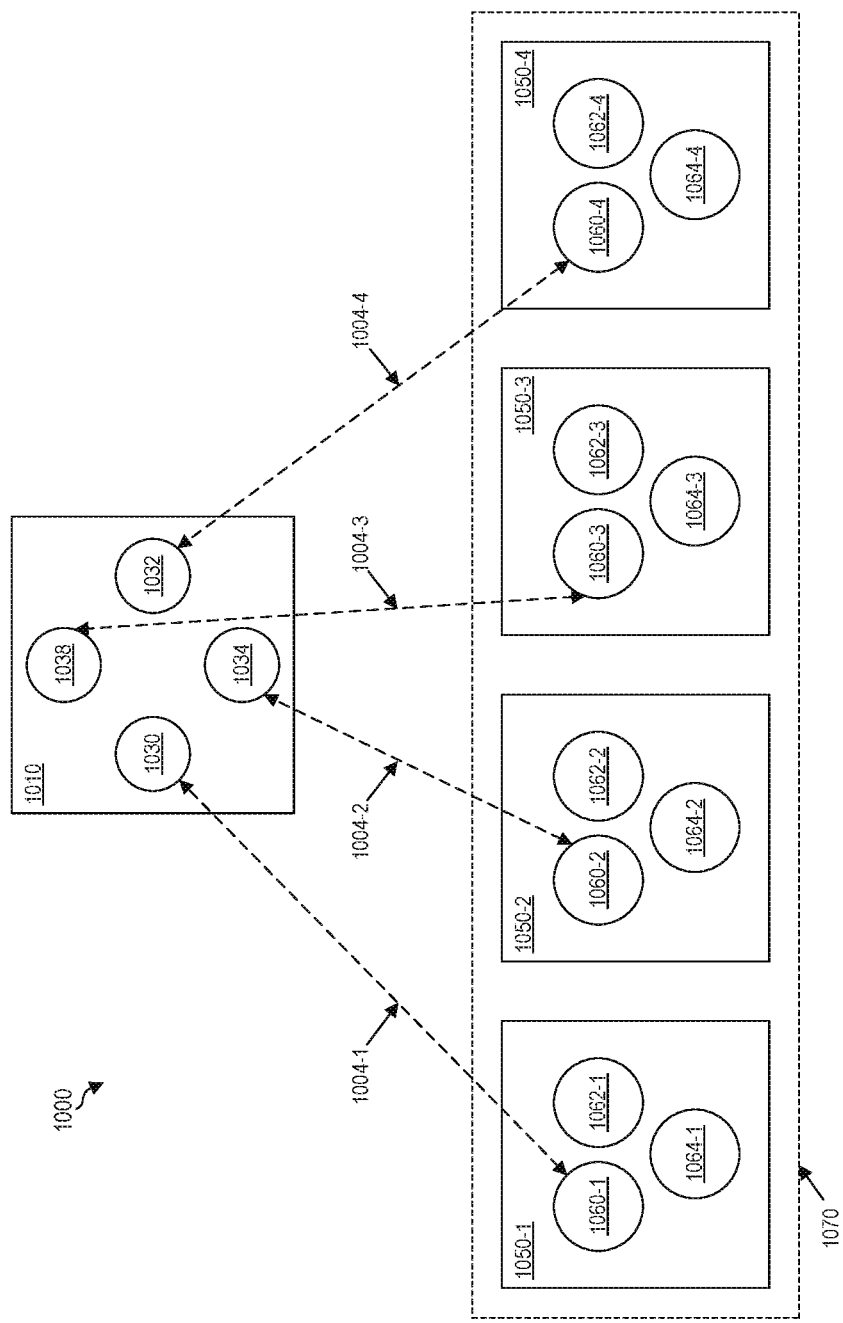

FIGS. 10A and 10B shows examples of enhanced client grouping by network device 1010. As shown in FIGS. 10A and 10B, system 1000 includes network device 1010 and four client devices 1050-1 to 1050-4. Network device 1010 comprises four transmitter antennas 1030, 1032, 1034, and 1038, and supports group sizes of up to the number of transmitter antennas per group (i.e., up to four client devices per group.) Client devices 1050-1 to 1050-4 comprise first receiver antennas 1060-1 to 1060-4, second receiver antennas 1062-1 to 1062-4, and third receiver antennas 1064-1 to 1064-4, wherein each client device comprises one first receiver antenna, one second receiver antenna, and one third receiver antenna. For ease of understanding, many aspects of system 1000 are omitted in FIGS. 10A and 10B, but system 1000 may include any element described in connection with system 600, above.

In the examples of FIGS. 10A and 10B, network device 1010 may group client devices 1050-1 to 1050-4 into one or more groups, so that each group comprises a number of client devices less than or equal to a number of transmitter antennas of the network device. For example, as shown in FIG. 10A, network device 1010 may group client devices 1050-1 to 1050-4 into one group 1070. Alternatively, as shown in FIG. 10B, network device 1010 may group client devices 1050-1 to 1050-4 into first group 1072 and second group 1074, wherein each group comprises two client devices. To determine whether to group client devices 1050-1 to 1050-4 into one group 1070 or into two groups 1072 and 1074, network device 1010 may predict a quality of channel feedback to transmit at least one spatial stream to one group 1070 of client devices 1050-1 to 1050-4, and a quality of channel feedback to transmit at least one spatial stream to two groups 1072 and 1074 of client devices 1050-1 to 1050-4. For example, network device 1010 may predict a quality of channel feedback to transmit one spatial stream to each of first receiver antennas 1060-1 to 1060-4, while second receiver antennas 1062-1 to 1062-4 and third receiver antennas 1064-1 to 1064-4 are not assigned spatial streams. Moreover, in such example, network device 1010 may predict a quality of channel feedback to transmit one spatial stream to each of first receiver antennas 1060-1 to 1060-4 and one spatial stream to each of second receiver antennas 1062-1 to 1062-4, while third receiver antennas 1064-1 to 1064-4 are not assigned spatial streams, In such example, based on a prediction that a quality of channel feedback to transmit at least one spatial stream to one group 1070 of client devices 1050-1 to 1050-4 is greater than a quality of channel feedback to transmit at least one spatial stream to two groups 1072 and 1074 of client devices 1050-1 to 1050-4, network device 1010 may group client devices 1050-1 to 1050-4 into one group 1070. Moreover, in such example, based on a prediction that a quality of channel feedback to transmit at least one spatial stream to one group 1070 of client devices 1050-1 to 1050-4 is less than a quality of channel feedback to transmit at least one spatial stream to two groups 1072 and 1074 of client devices 1050-1 to 1050-4, network device 1010 may group client devices 1050-1 to 1050-4 into two groups 1072 and 1074, wherein first group 1072 comprises first client device 1050-1 and second client device 1050-2, and second group 1074 comprises third client device 1050-3 and fourth client device 1050-4.

In the example of FIG. 10A, network device 1010 may assign one spatial stream to each client device of group 1070. For example, network device 1010 may assign one spatial stream to first client device 1050-1, one spatial stream to second client device 1050-2, one spatial stream to third client device 1050-3, and one spatial stream to fourth client device 1050-4.

In the examples of FIG. 10B, network device 1010 may assign one spatial stream to each client device of first group 1072. For example, network device 1010 may assign a first spatial stream to first receiver antenna 1060-1 of first client device 1050-1, and a first spatial stream to first receiver antenna 1060-2 of second client device 1050-2. Moreover, network device 1010 may assign a spatial stream to each of a portion of the remaining receiver antennas of first group 1072. For example, network device 1010 may assign a second spatial stream to second receiver antenna 1062-1 of first client device 1050-1, and a second spatial stream to second receiver antenna 1062-2 of second client device 1050-2. Similarly, network device 1010 may assign two spatial streams to each of third client device 1050-3 and fourth client device 1050-4 of second group 1074.

In the examples of FIGS. 10A and 10B, network device 1010 may transmit, by transmitter antennas 1030, 1032, 1034, and 1038 each spatial stream assigned to each group of client devices via a plurality of communication links.

For instance, in the example of FIG. 10A, network device 1010 may transmit, by first transmitter antenna 1030, the one spatial stream assigned to first client device 1050-1 to first receiver antenna 1060-1 via first communication link 1004-1. Moreover, network device 1010 may transmit, by third transmitter antenna 1034, the one spatial stream assigned to second client device 1050-2 to first receiver antenna 1060-2 via second communication link 1004-2. Moreover, network device 1010 may transmit, by fourth transmitter antenna 1038, the one spatial stream assigned to third client device 1050-3 to first receiver antenna 1060-3 via third communication link 1004-3. Moreover, network device 1010 may transmit, by second transmitter antenna 1032, the one spatial stream assigned to fourth client device 1050-4 to first receiver antenna 1060-4 via fourth communication link 1004-4. In the example of FIG. 10A, network device 1010 may simultaneously transmit the spatial streams assigned to group 1070.

Furthermore, in the example of FIG. 10B, network device 1010 may transmit, by first transmitter antenna 1030, the first spatial stream assigned to first client device 1050-1 to first receiver antenna 1060-1 via fifth communication link 1004-5. Moreover, network device 1010 may transmit, by fourth transmitter antenna 1038, the second spatial stream assigned to first client device 1050-1 to second receiver antenna 1062-1 via sixth communication link 1004-6. Moreover, network device 1010 may transmit, by third transmitter antenna 1034, the first spatial stream assigned to second client device 1050-2 to first receiver antenna 1060-2 via seventh communication link 1004-7. Moreover, network device 1010 may transmit, by second transmitter antenna 1032, the second spatial stream assigned to second client device 1050-2 to second receiver antenna 1062-2 via eighth communication link 1004-8. Similarly, in the example of FIG. 10B, network device 1010 may transmit each spatial stream assigned to second group 1074 via a plurality of communication links. In the example of FIG. 10B, network device 1010 may simultaneously transmit the spatial streams assigned to first group 1072, and may simultaneously transmit the spatial streams assigned to second group 1074.

In this manner, network device 1010 provides enhanced client grouping which may increase throughput over prior approaches when using a DL MU-MIMO scheme. For instance, in the example of FIG. 10A, network device 1010 may provide, for group 1070 of client devices 1050-1 to 1050-4, at least one receiver antenna that is not assigned a spatial stream, and thus, can be used to cancel interference during DL MU-MIMO transmission of each spatial stream assigned to group 1070. Moreover, in the example of FIG. 10B, network device 1010 may provide, for each of first and second groups 1072 and 1074 of client devices 1050-1 to 1050-4, at least one receiver antenna that is not assigned a spatial stream, and thus, can be used to cancel interference during DL MU-MIMO transmission of each spatial stream assigned to the group. Moreover, network device 1010 may determine whether to group client devices 1050-1 to 1050-4 into one group 1070 (as shown in FIG. 10A) or into two groups 1074 and 1078 (as shown in FIG. 10B), based on a prediction a quality of channel feedback to transmit at least one spatial stream to one group 1070 of client devices 1050-1 to 1050-4, and based on a prediction of a quality of channel feedback to transmit at least one spatial stream to two groups 1072 and 1074 of client devices 1050-1 to 1050-4. Accordingly, in such examples, network device 1010 may improve throughput when using Enhanced DL MU-MIMO as compared to when using Default DL MU-MIMO.

Figure 11:
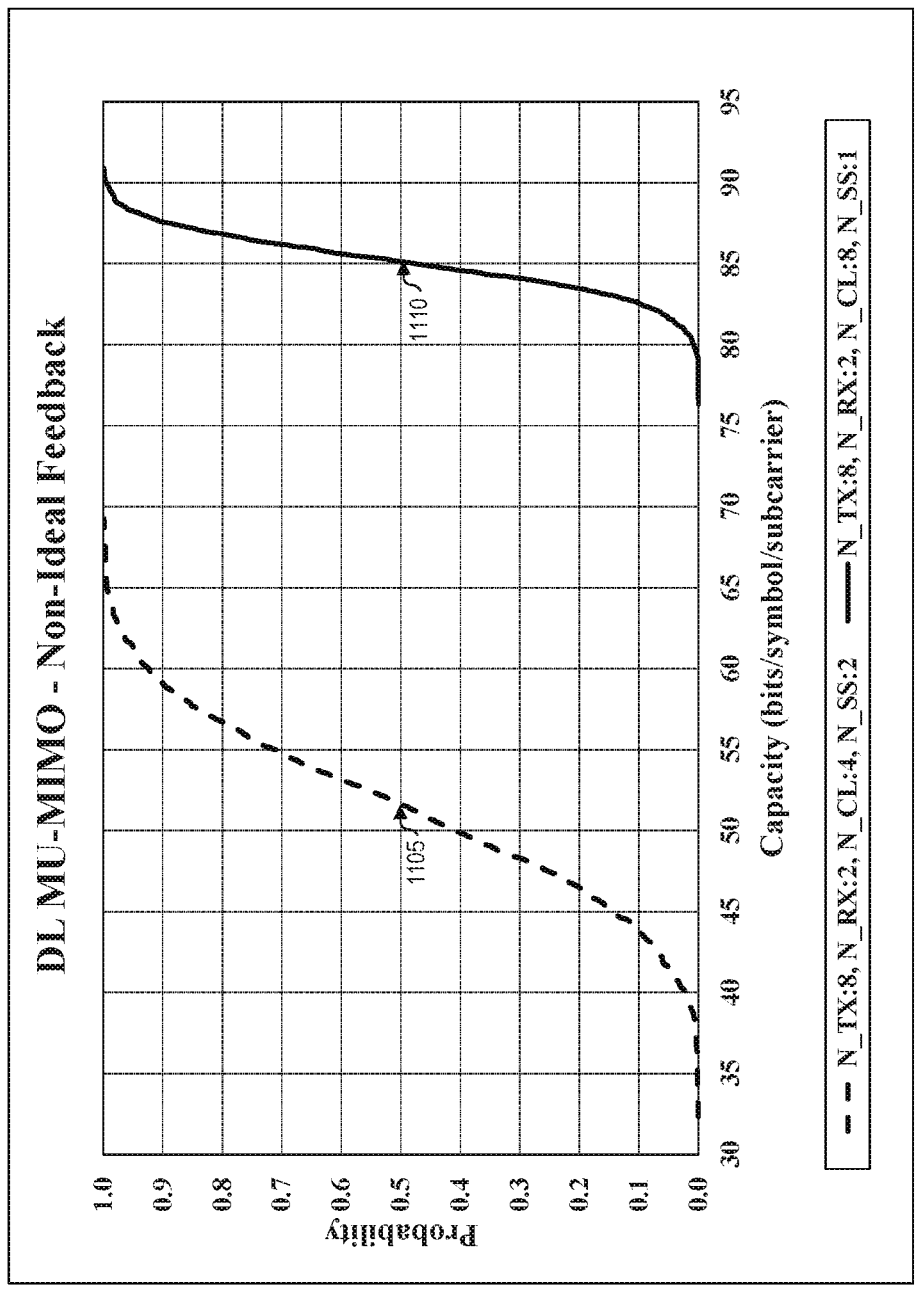
FIG. 11 is a graph which shows a probability distribution function of an example simulated DL MU-MIMO system using a non-ideal channel feedback model.

FIG. 11 is a graph 1100 which shows a probability distribution function of an example simulated DL MU-MIMO system using a non-ideal channel feedback model. Like the examples of FIGS. 4 and 5, the probability distribution function shown in FIG. 11 is measured as a probability of throughput capacity of the simulated DL MU-MIMO system versus throughput capacity of the simulated DL MU-MIMO system, However, unlike the examples of FIGS. 4 and 5, which modeled channel feedback for a network device having four transmitter antennas, the example of FIG. 11 modeled channel feedback for a network device having eight transmitter antennas. Moreover, in the example of FIG. 11, the channel feedback model incorporated impairments from channel feedback. Curve 1105 represents a probability distribution function of throughput capacity obtained by the simulated DL MU-MIMO system when it modeled transmission of eight spatial streams to four client devices each comprising two receiver antennas. Curve 1110 represents a probability distribution function of throughput capacity obtained by the simulated DL MU-MIMO system when modeled transmission of eight spatial streams to eight client devices each comprising two receiver antennas.

As shown in FIG. 11, when the simulated DL MU-MIMO system was modeled to transmit eight spatial streams to eight client devices each having two receiver antennas, its throughput capacity (as shown by curve 1110) was increased by about 67% as compared when the simulated DL MU-MIMO system was modeled to transmit eight spatial streams to four client devices each having two receiver antennas (as shown by curve 1005.) Thus, it was discovered that Enhanced DL MU-MIMO could be implemented on a network device having greater than four receiver antennas (e.g., eight transmitter antennas.) Moreover, it will be understood by one skilled in the art that Enhanced DL MU-MIMO can be implemented on a network device having any suitable number of transmitter antennas.

Figure 12:
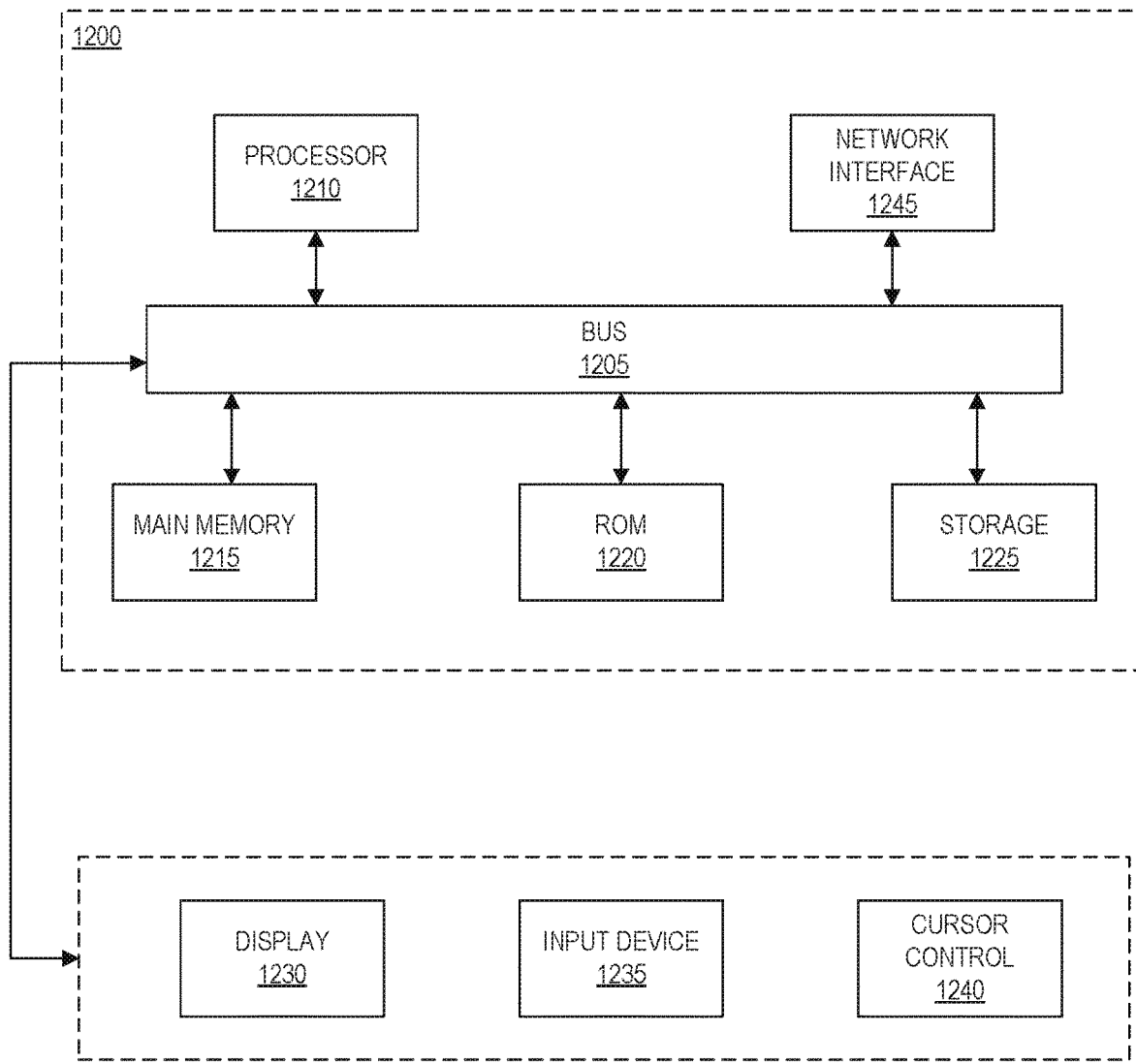
FIG. 12 is a block diagram of an example computer system in which various embodiments described herein may be implemented.

FIG. 12 is a block diagram of an example computer system 1200 in which various embodiments described herein may be implemented. Computer system 1200 includes bus 1205 or other communication mechanism for communicating information, at least one hardware processor 1210 coupled with bus 1205 for processing information. At least one hardware processor 1210 may be, for example, at least one general purpose microprocessor.

Computer system 1200 also includes main memory 1215, such as random access memory (RAM), cache, other dynamic storage devices, or the like, or a combination thereof, coupled to bus 1205 for storing information and one or more instructions to be executed by at least one processor 1210. Main memory 1215 also may be used for storing temporary variables or other intermediate information during execution of one or more instructions to be executed by at least one processor 1210. Such one or more instructions, when stored on storage media accessible to at least one processor 1210, render computer system 1200 into a special-purpose machine that is customized to perform the operations specified in the one or more instructions.

Computer system 1200 further includes read only memory (ROM) 1220 or other static storage device coupled to bus 1205 for storing static information and one or more instructions for at least one processor 1210. At least one storage device 1225, such as a magnetic disk, optical disk, or USB thumb drive (Flash drive), or the like, or a combination thereof, may be provided and coupled to bus 1205 for storing information and one or more instructions.

Computer system 1200 may further include display 1230 coupled to bus 1205 for displaying a graphical output to a user. The computer system 1200 may further include input device 1235, such as a keyboard, camera, microphone, or the like, or a combination thereof, coupled to bus 1205 for providing an input from a user. Computer system 1200 may further include cursor control 1240, such as a mouse, pointer, stylus, or the like, or a combination thereof, coupled to bus 1205 for providing an input from a user.

Computer system 1200 may further includes at least one network interface 1245, such as a network interface controller (NIC), network adapter, or the like, or a combination thereof, coupled to bus 1205 for connecting computer system 1200 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to at least one processor 1210 executing one or more sequences of one or more instructions contained in main memory 1215. Such one or more instructions may be read into main memory 1215 from another storage medium, such as at least one storage device 1225. Execution of the sequences of one or more instructions contained in main memory 1215 causes at least one processor 1210 to perform the process steps described herein. In alternative embodiments, hard-wired circuitry may be used in place of or in combination with software instructions.

As used herein, the term "Wi-Fi" is meant to encompass any type of wireless communications that conforms to the Institute of Electrical and Electronic Engineers (IEEE) 802.11 standard, whether 802.11ac, 802.11ax, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of WAP with any other brand of client hardware that also is certified. Typically, however, any Wi-Fi product using the same radio frequency (e.g., 5 GHz for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

As used herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
    determining, by a network device comprising a plurality of transmitter antennas, that a plurality of client devices each comprising a plurality of receiver antennas are associated with the network device;
    grouping, by the network device, the client devices into one or more groups, wherein each group comprises a number of client devices less than or equal to the number of transmitter antennas;
    for each group, assigning, by the network device, one spatial stream to one receiver antenna for each client device of the group; and
    for each group, based on a determination that the number of client devices of the group is greater than one and less than the number of transmitter antennas, assigning, by the network device, one spatial stream to each of a portion of the remaining receiver antennas of the group, wherein at least one receiver antenna of the group is not assigned a spatial stream.

2. The method of claim 1, wherein for each group, transmitting, by the network device, each spatial stream assigned to the group.

3. The method of claim 2, wherein for each group, transmitting each spatial stream assigned to the group comprises transmitting, by each of the transmitter antennas, one of the spatial streams to the assigned one of the receiver antennas of the group.

4. The method of claim 2, wherein for each group, transmitting each spatial stream assigned to the group comprises cancelling interference by the at least one receiver antenna of the group that is not assigned a spatial stream.

5. The method of claim 1, wherein grouping the one or more client devices associated with the network device comprises:
    grouping the client devices into one group, based on a determination that the number of client devices associated with the network device is less than or equal to the number of transmitter antennas; and
    grouping the client devices into a plurality of groups, so that up to one group has a different number of client devices than the number of transmitter antennas, based on a determination that the number of client devices associated with the network device is greater than the number of transmitter antennas.

6. The method of claim 1, wherein for each group, based on a determination that the number of client devices of the group is greater than one and less than the number of transmitter antennas, determining the portion of the remaining receiver antennas of the group based on queue depth of the network device.

7. The method of claim 1, wherein grouping the one or more client devices into one or more groups comprises determining, for each group, a number of client devices for the group, based on predicting of a quality of channel feedback to transmit each spatial stream assigned to the number of client devices for the group.

8. The method of claim 1, wherein for each group, based on a determination that the number of client devices of the group is equal to one, assigning, by the network device, one spatial stream to each of the remaining receiver antennas of the client device of the group.

9. A network device, comprising:
    a plurality of transmitter antennas;
    at least one processing resource; and
    at least one non-transitory machine-readable storage medium comprising instructions executable by at least one processing resource to:
        determine that a plurality of client devices each comprising a plurality of receiver antennas are associated with the network device;
        group the client devices into one or more groups, wherein each group comprises a number of client devices less than or equal to the number of transmitter antennas;
        for each group, assign one spatial stream to one receiver antenna for each client device of the group; and
        for each group, based on a determination that the number of client devices of the group is greater than one and less than the number of transmitter antennas, assign one spatial stream to each of a portion of the remaining receiver antennas of the group, wherein at least one receiver antenna of the group is not assigned a spatial stream.

10. The network device of claim 9, wherein the instructions comprise instructions to, for each group, transmit each spatial stream assigned to the group.

11. The network device of claim 10, wherein the instructions to, for each group, transmit each spatial stream assigned to the group comprises instructions to transmit, by each one of the transmitter antennas, one of the spatial streams to the assigned one of the receiver antennas of the group.

12. The network device of claim 10, wherein the instructions to, for each group, transmit each spatial stream assigned to the group comprises instructions to cancel interference by the at least one receiver antenna of the group that is not assigned a spatial stream.

13. The network device of claim 9, wherein the instructions to group the client devices comprises instructions to:
    group the client devices into one group, based on a determination that the number of client devices associated with the network device is less than or equal to the number of transmitter antennas; and
    group the client devices into a plurality of groups, so that up to one group has a different number of client devices than the number of transmitter antennas, based on a determination that the number of client devices associated with the network device is greater than the number of transmitter antennas.

14. The network device of claim 9, wherein the instructions comprise instructions to, for each group, based on a determination that the number of client devices of the group is greater than one and less than the number of transmitter antennas, instructions to determine the portion of the remaining receiver antennas of the group based on queue depth of the network device.

15. The network device of claim 9, wherein the instructions to group the client devices into one or more groups comprises instructions to determine, for each group, a number of client devices for the group, based on a prediction of a quality of channel feedback to transmit each spatial stream assigned to the number of client devices for the group.

16. The network device of claim 9, wherein the instructions comprise instructions to, for each group, based on a determination that the number of client devices of the group is equal to one, assign one spatial stream to each receiver antenna of the remaining receiver antennas of the client device of the group.

17. An article comprising at least one non-transitory machine-readable storage medium comprising instructions executable by at least one processing resource to:
determine that a plurality of client devices each comprising a plurality of receiver antennas are associated with a network device;
group the client devices into one or more groups, wherein each group comprises a number of client devices less than or equal to the number of transmitter antennas;
for each group, assign one spatial stream to one receiver antenna for each client device of the group; and
for each group, based on a determination that the number of client devices of the group is greater than one and less than the number of transmitter antennas, assign one spatial stream to each of a portion of the remaining receiver antennas of the group, wherein at least one receiver antenna of the group is not assigned a spatial stream.

18. The article of claim 17, wherein the instructions comprise instructions to, for each group, transmit each spatial stream assigned to the group simultaneously.

19. The article of claim 17, wherein the instructions to, for each group, transmit each spatial stream assigned to the group comprise instructions to cancel interference by the at least one receiver antenna of the group that is not assigned a spatial stream.

20. The article of claim 18, wherein the instructions to group the client devices into one or more groups comprises instructions to determine, for each group, a number of client devices for the group, based on a prediction of a quality of channel feedback to transmit each spatial stream assigned to the number of client devices for the group.

* * * * *